US012743964B2

(12) United States Patent
Morton et al.

(10) Patent No.: US 12,743,964 B2
(45) **Date of Patent: *Sep. 22, 2026**

(54) MISSION-BASED, GAME-IMPLEMENTED CYBER TRAINING SYSTEM AND METHOD

(71) Applicant: Circadence Corporation, Boulder, CO (US)

(72) Inventors: Gary D. Morton, Erie, CO (US); Mark Mihelic, Boulder, CO (US); Michael Moniz, Boulder, CO (US); Paul R. Thornton, Tupelo, MS (US); Ryan Pressley, Saltillo, MS (US); Laura Lee, San Diego, CA (US)

(73) Assignee: Circadence Corporation, Boulder, CO (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/794,715

(22) Filed: Aug. 5, 2024

(65) Prior Publication Data

US 2025/0078678 A1 Mar. 6, 2025

Related U.S. Application Data

(63) Continuation of application No. 17/534,741, filed on Nov. 24, 2021, now abandoned, which is a (Continued)

(51) Int. Cl.
*G09B 9/30* (2006.01)
*A63F 9/24* (2006.01)

(Continued)

(52) U.S. Cl.
CPC .................. *G09B 9/00* (2013.01); *A63F 9/24* (2013.01); *A63F 13/00* (2013.01); *A63F 13/85* (2014.09);

(Continued)

(58) Field of Classification Search
CPC ......... G09B 9/00; G09B 19/0053; A63F 9/24; A63F 13/00; A63F 13/85; G06N 3/006; H04L 67/131; G06Q 50/20
See application file for complete search history.

(56) References Cited

U.S. PATENT DOCUMENTS 7,474,429 B2 1/2009 Morooka et al.
7,837,543 B2 * 11/2010 Graepel .................. A63F 13/10 463/1

(Continued)

FOREIGN PATENT DOCUMENTS

AU 2016327973 1/2020
JP 2013236687 11/2013

(Continued)

OTHER PUBLICATIONS

International Search Report and Written Opinion for International Application No. PCT/US2016/53430 mailed Dec. 29, 2016, 9 pages.

(Continued)

*Primary Examiner* — Masud Ahmed
(74) *Attorney, Agent, or Firm* — Snell & Wilmer LLP

(57) ABSTRACT

A mission-based cyber training platform allows both offensive and defensive oriented participants to test their skills in a game-based virtual environment against a live or virtual opponent. The system builds realistic virtual environments to perform the training in an isolated and controlled setting. Dynamic configuration supports unique missions using a combination of real and/or virtual machines, software resources, tools, and network components. Game engine behaves in a manner that will vary if participant attempts to replay a scenario based upon alternate options available to the engine. Scoring and leader boards are used to identify skill gaps/strengths and measure performance for each train- (Continued)

ing participant. A detailed assessment of a player's performance is provided at the end of the mission and is stored in a user profile/training record.

14 Claims, 12 Drawing Sheets

Related U.S. Application Data continuation of application No. 16/720,399, filed on Dec. 19, 2019, now Pat. No. 11,189,188, which is a continuation of application No. 16/056,892, filed on Aug. 7, 2018, now Pat. No. 10,515,564, which is a continuation of application No. 15/274,096, filed on Sep. 23, 2016, now Pat. No. 10,056,005.

(60) Provisional application No. 62/232,423, filed on Sep. 24, 2015.

(51) Int. Cl.

| | |
|---|---|
| ***A63F 13/00*** | (2014.01) |
| ***A63F 13/85*** | (2014.01) |
| ***G06N 3/006*** | (2023.01) |
| ***G09B 9/00*** | (2006.01) |
| ***G09B 19/00*** | (2006.01) |
| ***H04L 67/131*** | (2022.01) |

(52) U.S. Cl.

CPC ......... *G06N 3/006* (2013.01); *G09B 19/0053* (2013.01); *H04L 67/131* (2022.05)

(56) References Cited

U.S. PATENT DOCUMENTS

| | | | | |
|---|---|---|---|---|
| 8,005,879 | B2 | 8/2011 | Bornhoevd et al. | |
| 8,099,272 | B2 | 1/2012 | Conway | |
| 8,266,320 | B1 | 9/2012 | Bell et al. | |
| 8,554,536 | B2 | 10/2013 | Adelman et al. | |
| 8,751,629 | B2 | 6/2014 | White et al. | |
| 9,076,342 | B2 | 7/2015 | Brueckner et al. | |
| 9,246,768 | B2 | 1/2016 | White et al. | |
| 9,697,355 | B1 | 7/2017 | Park et al. | |
| 10,056,005 | B2 | 8/2018 | Morton et al. | |
| 10,238,948 | B2 | 3/2019 | Morton et al. | |
| 10,515,564 | B2 | 12/2019 | Morton et al. | |
| 10,518,162 | B2 | 12/2019 | Morton et al. | |
| 2003/0046689 | A1 | 3/2003 | Gaos | |
| 2005/0192870 | A1 | 9/2005 | Geddes | |
| 2007/0066403 | A1* | 3/2007 | Conkwright | A63F 13/10 463/43 |
| 2008/0108021 | A1 | 5/2008 | Slayton et al. | |
| 2009/0208910 | A1 | 8/2009 | Brueckner et al. | |
| 2009/0254842 | A1 | 10/2009 | Leacock et al. | |
| 2009/0298038 | A1 | 12/2009 | Mitchell | |
| 2009/0320137 | A1 | 12/2009 | White et al. | |
| 2011/0039237 | A1 | 2/2011 | Skare | |
| 2011/0257961 | A1 | 10/2011 | Tinkler et al. | |
| 2012/0058829 | A1* | 3/2012 | Yanagisawa | A63F 13/56 463/43 |
| 2012/0084242 | A1* | 4/2012 | Levin | B82Y 10/00 706/46 |
| 2012/0124671 | A1 | 5/2012 | Fritzson et al. | |
| 2013/0014264 | A1 | 1/2013 | Kennedy et al. | |
| 2013/0288788 | A1* | 10/2013 | Lim | A63F 13/795 463/31 |
| 2014/0120993 | A1* | 5/2014 | Tsuchiya | A63F 13/10 463/4 |
| 2014/0186801 | A1* | 7/2014 | Slayton | A63F 13/04 434/16 |
| 2014/0199663 | A1 | 7/2014 | Sadeh-Koniecpol et al. | |
| 2015/0040033 | A1 | 2/2015 | Kurtz et al. | |
| 2015/0050623 | A1* | 2/2015 | Falash | G09B 9/24 434/38 |
| 2015/0143374 | A1 | 5/2015 | Banga et al. | |
| 2015/0229664 | A1 | 8/2015 | Hawthorn et al. | |
| 2015/0231502 | A1 | 8/2015 | Allen et al. | |
| 2017/0032694 | A1 | 2/2017 | Brueckner et al. | |
| 2017/0103783 | A1 | 4/2017 | Paglia et al. | |
| 2017/0140660 | A1 | 5/2017 | Morton et al. | |
| 2017/0140663 | A1 | 5/2017 | Sadeh-Koniecpol et al. | |
| 2017/0244746 | A1 | 8/2017 | Hawthorn et al. | |
| 2018/0247562 | A1 | 8/2018 | Downs | |
| 2019/0005831 | A1 | 1/2019 | Seaton | |
| 2019/0066530 | A1 | 2/2019 | Lee et al. | |

FOREIGN PATENT DOCUMENTS

| | | |
|---|---|---|
| JP | 6818033 | 1/2021 |
| SG | 11201802370 P | 7/2021 |
| SK | 10-2009-0015421 | 2/2009 |
| SK | 10-1534194 | 7/2015 |
| SK | 10-2113587 | 5/2020 |

OTHER PUBLICATIONS

International Search Report and Written Opinion for International Application No. PCT/US2018/23523 mailed Jun. 1, 2018, 9 pages.

International Search Report and Written Opinion for International Application No. PCT/US2018/47509 mailed Oct. 29, 2018, 14 pages.

Price et al., Asset Criticality in Mission Reconfigurable Cyber Systems and its Contribution to Key Cyber Terrain, Proceedings of the 50th Hawaii International Conference on System Sciences, Jan. 2017, retrieved from https://scholarspace.manoa.hawaii.edu/handle/10125/41893, 1 page.

Ernits et al., i-tee: A fully automated Cyber Defense Competition for Students, Copyright 2015, 2 pages.

European Search Report for Application No. 16849744.4, mailed Jan. 16, 2019, 12 pages.

Office Action Report for Korean Patent Application No. 10-2018-7011555, mailed Apr. 4, 2019, 17 pages.

Search Report and Written Opinion for Singapore Patent Application No. 11201802370P, mailed Jul. 16, 2019, 11 pages.

Office Action for Japanese Patent Application No. 2018-536063, mailed Feb. 4, 2020, 6 pages.

Examination Report for European Patent Application No. 16849744.4, mailed Feb. 1, 2020, 11 pages.

Notice of Patent Grant for Korean Patent Application No. 10-2018-7011555, mailed Feb. 28, 2020, 4 pages.

Written Opinion issued by the Intellectual Property Office of Singapore for Application No. 11201802370P, mailed Jun. 18, 2020, 6 pages.

Search Report issued by the European Patent Office for Application No. 18770177.6, mailed Sep. 29, 2020, 7 pages.

Search Report and Written Opinion issued by the Intellectual Property Office of Singapore for Application No. 11201908653W, mailed Feb. 14, 2021, 9 pages.

Notice of Acceptance of Patent Application issued by IP Australia for Application No. 2019268206, mailed Jul. 21, 2021, 4 pages.

Brien Posey, "Create Outlook 2007 rules to organize email", 2010, techtarget.com, pp. 1-2, at https://searchwindowsserver.techtarget.com/tip/Create-Outlook-2007-rules-to-organize-email, (last visited Aug. 11, 2020). (Year: 2010).

Search Report and Written Opinion for Singapore Patent Application No. 10202106750Y, mailed Jan. 23, 2025, 14 pages.

* cited by examiner

FIG. 1

ORCHESTRATION OVERVIEW

MISSION-BASED, GAME-IMPLEMENTED CYBER TRAINING SYSTEM AND METHOD

RELATED APPLICATION DATA

This application is a continuation of U.S. application Ser. No. 17/534,741, filed Nov. 24, 2021, which is a continuation of U.S. application Ser. No. 16/720,399, filed Dec. 19, 2019, now U.S. Pat. No. 11,189,188, which is a continuation of U.S. application Ser. No. 16/056,892, filed Aug. 7, 2018, now U.S. Pat. No. 10,515,564, which is a continuation of U.S. application Ser. No. 15/274,096, filed Sep. 23, 2016, now U.S. Pat. No. 10,056,005, and claims priority to U.S. Provisional Application Ser. No. 62/232,423, filed Sep. 24, 2015. The present application incorporates each of those prior applications by reference as if set forth in their entirety herein.

FIELD OF THE INVENTION

The present invention relates to computer-implemented training systems and methods.

BACKGROUND OF THE INVENTION

With the growing reliance on information systems technology and the Internet, the number of cyber-attacks is increasing at an alarming rate. Further complicating the issue, cyber threats are continuing to evolve with increasing complexity impacting consumers, businesses and governmental entities every day. Hacking attempts are on the rise throughout government and private industry. According to cyber threat information provided by the Department of Homeland Security, the Pentagon reports getting 10 million hacks per day, the State of Utah faces 20 million attempts, and the energy company BP says it deals with 50,000 attempts per day. But these are only a small sample of the daily threats being encountered by information systems. Even more disconcerting is that many of these attacks are successful each year, costing hundreds of billions of dollars.

As cyber-attacks continue to increase and become more sophisticated, the need for security systems and highly trained experts to protect industry and government information systems is growing just as fast. This rapidly growing cyber security threat landscape coupled with the shortage of personnel with the expertise required to safeguard critical systems and sensitive information poses a serious security risk for the public and private sectors.

Unfortunately, current training methods are severely challenged to keep up-to-date and provide the training necessary to combat the threat. This highly complex security training has traditionally occurred in the classroom or has been provided by consultants with access to live systems evaluating real-time security threats as they occur. These existing training methodologies and techniques cannot keep up with the rapidly changing security threats nor can they train personnel fast enough. To further complicate existing training programs, real-life cyber threat scenarios become outdated by new threats shortly after training is introduced.

Current training systems are built with the specific target for training in mind and dedicated to staff and students as such. For example, some of these targets may include healthcare, cybersecurity, power grid network infrastructure, etc. Current training systems are customized with hardware, software, and built to satisfy the training needs of the targeted industry. Present day systems are generally static in nature and configured once for the targeted industry, then modified manually as training needs and technology changes.

This focused manual customization for each industry target in need of training increases the cost of the overall training system development and support, making current training systems expensive and too costly for most businesses desperately in need of such state of the art training. Such legacy training systems require extensive manual modification and on-going customization to keep up with the student's training needs and the rapid pace of technology evolution in each particular industry where training is required. This fast-paced evolution of technology quickly makes training systems obsolete and in need of revision to keep up with the continual flow of new students, new systems and new operational methods.

Further, even in those situations where computer implemented training systems have been developed, those systems suffer from similar problems. While these systems can be used to train a larger numbers of students, the training systems are not flexible and provide limited training benefits. For example, existing training systems are designed to implement fixed training sessions. That is, these training systems include one or more predesigned or fixed training applications. The training system simply implements that single fixed training application or selects from one of a small set of fixed training application. Thus, students see the same training environments over and over. If the operator desires to present student with a different training session or environment, an entirely new training application must be built and loaded into the training system.

This "select from fixed training sessions" configuration is consistent with the goal of existing training sessions: to create a training session in which a student practices or implements one or more specific tasks. In accordance with the task-based training, the training is used to train the student on a particular task and to increase their proficiency in implementing the task. However, in the real world, each cyber threat is very different. Thus, a student's ability to perform a particular designated task is insufficient in helping the student understand when to perform the task or how to use it in conjunction with other tasks or techniques in order to address a cyber threat.

Given the rapidly changing cyber threat risk and the constant attacks from hackers around the world, a dynamic, virtual network training system and method are needed to provide a closed, controlled network environment with the level of complexity needed to train experts how to rapidly respond to cyber-attacks, terrorism, and cyber-crime, and how to stop them.

SUMMARY OF THE INVENTION

One aspect of the invention is a cyber training system. In one embodiment, training which is implemented by the cyber training system is mission-based, rather than task based. In one embodiment, the training which is implemented by the cyber training system is also implemented as a game.

In one embodiment, the system includes a core set of databases, tools and Application Programming Interfaces (APIs) to generate a nearly infinite variety of training system configurations comprising different environments with different resources, and having different missions.

The system may be configured with a game engine and a Virtual Event Manager (VEM) which are configured to implement and/or manage: (1) a plurality of scenario environment types such as: cyber threat, power grid, custom systems, etc.; (2) a plurality of unique resource and mission databases, each dedicated to an environment type; (3) a core set of tools and resources common to all environment types; (4) the selection of an environment type, use of dedicated databases, and configuration of a unique environment; (5) use of both host-based and network-based sensors; and/or (6) game play between at least two live students or between a live student and an artificial intelligence (AI) computerized player.

In one embodiment, the invention comprises a dynamic, scenario-based training platform to allow both "offensive" and "defensive" oriented participants to test their skills in a game environment against a sophisticated opponent.

In one embodiment, the training takes place within the framework of a game environment combining an AI opponent within a realistic virtual environment and hacking simulation. The game environment provides dynamic and highly interactive scenarios to facilitate realistic situational training within a controlled environment. This unique use of systems technology, simulation and game interface facilitates the training of personnel to rapidly develop the skillsets needed for the cyber security expertise needed across both industry and governmental information technology entities.

Moreover, many organizations would like to avoid performing penetration testing on their production networks for a variety of reasons including the risk to disrupting functionality, or potential vulnerabilities or malicious implants being introduced by the external penetration testing teams and tools. By capturing essential network elements and components such as topology maps, component lists, host types and configurations, to name a few, extensible virtualized environments can emulate the key aspects of the production networks. Such virtual environments, comprised of a plurality of virtual machines, are more efficient than a fixed hardware configuration by reducing the number of hardware components and the associated maintenance costs. As such, penetration testing and related activities can be performed in a safe and isolated manner on the virtualized environment at a much higher frequency, and the lessons-learned about discovered vulnerabilities, weaknesses, strengths, and impacts can be applied to the production network in a methodical and controlled manner.

In alternative embodiments, a specific targeted hardware device such as part of an industrial control system may be required to co-exist with virtual network elements and components to collectively form an extensible virtualized and physical environment that properly emulates a targeted production network.

Other aspects and components of the disclosed system may include:

(1) An AI opponent implemented by an AI engine, used in cyber security training and practice settings. The AI engine makes each game unique depending on how the training participant reacts to the uniquely configured system-network simulation.

(2) The system builds realistic virtual environments to perform the training in an isolated and controlled setting. The system may facilitate the building of: (a) unique virtual environments for each cyber training mission; (b) use of virtual environments in order to expand the scale of the training simulation by taking advantage of cloud based compute, network, and storage resources; (c) use of both host-based and network-based sensors for use in evaluating student activities during mission; and (d) use of specific hardware components, such as unique controllers, processors and peripheral devices required to emulate a specific target or production environment.

(3) Implementation of both offensive and defensive cyber training missions.

(4) Scoring and leader boards to identify skill gaps/strengths and measure performance for each participant playing the game.

(5) Game like visualization and multi-media stimulation to make the cyber security training more engaging for the participants.

(6) A mission oriented scenario-based training environment with unique training objectives for each mission. New missions can be constructed purely in a description language, then fed to the training environment, which will construct the environments with the necessary compute, network, storage requirements, tools, sensors, threats and mitigations to execute a mission.

(7) The system can be configured to support a wide variety of industry and training needs wherein unique computing and network environments are provided for each mission presented to one or more students.

(8) A closed network environment to isolate the training scenario and control it.

(9) Dynamic configuration to support unique missions using a combination of virtual machines (and in some cases, real devices), software resources, tools, and network components are configured for every mission.

(10) Missions including at least one live student (student) and one AI student.

(11) Team play which allows two or more live offensive students to play against one or more defensive students or two or more defensive students to play against one or more offensive students. Offensive or defensive students can be human or AI.

(12) Student selection of the role they will take on during the mission. Students may take on offensive or defensive roles with each having objectives that relate to points to track how the student is doing.

(13) Trainers which monitor each mission with the ability to join the mission to guide students, modify settings and challenge players in objectives and scenario situations in real-time.

(14) Dynamic updates to resources as new resources become available and dynamic updates to missions as new requirements are defined.

(15) An AI advisor which is capable of receiving messages or inquiries from a student during a mission and to provide intelligent responses, such as hints or tips.

Further objects, features, and advantages of the present invention over the prior art will become apparent from the detailed description of the drawings which follows, when considered with the attached figures.

DESCRIPTION OF THE DRAWINGS

FIG. 1 diagrammatically illustrates mission scenarios of various types which may be implemented in accordance with the present invention;

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Overview

This invention comprises various embodiments of systems, methods, and apparatus for providing dynamically configured, closed network-environment training to one or more students. Because the system herein provides training in a game format, the students may also be referred to as participants or players.

One aspect of the present disclosure relates to a system which is configured to generate a configurable, virtual computing, cyber threat training environment wherein scenario-based or oriented missions are defined and implemented. A scenario is comprised of a virtual network of computer hosts, a threat or threat actor, mission objectives, training goals and tools to form a mission training session. The missions are game-based activities which embody a scenario to provide context and an environment to challenge one or more players to achieve the training goals via one or more tasks.

Figure 1:
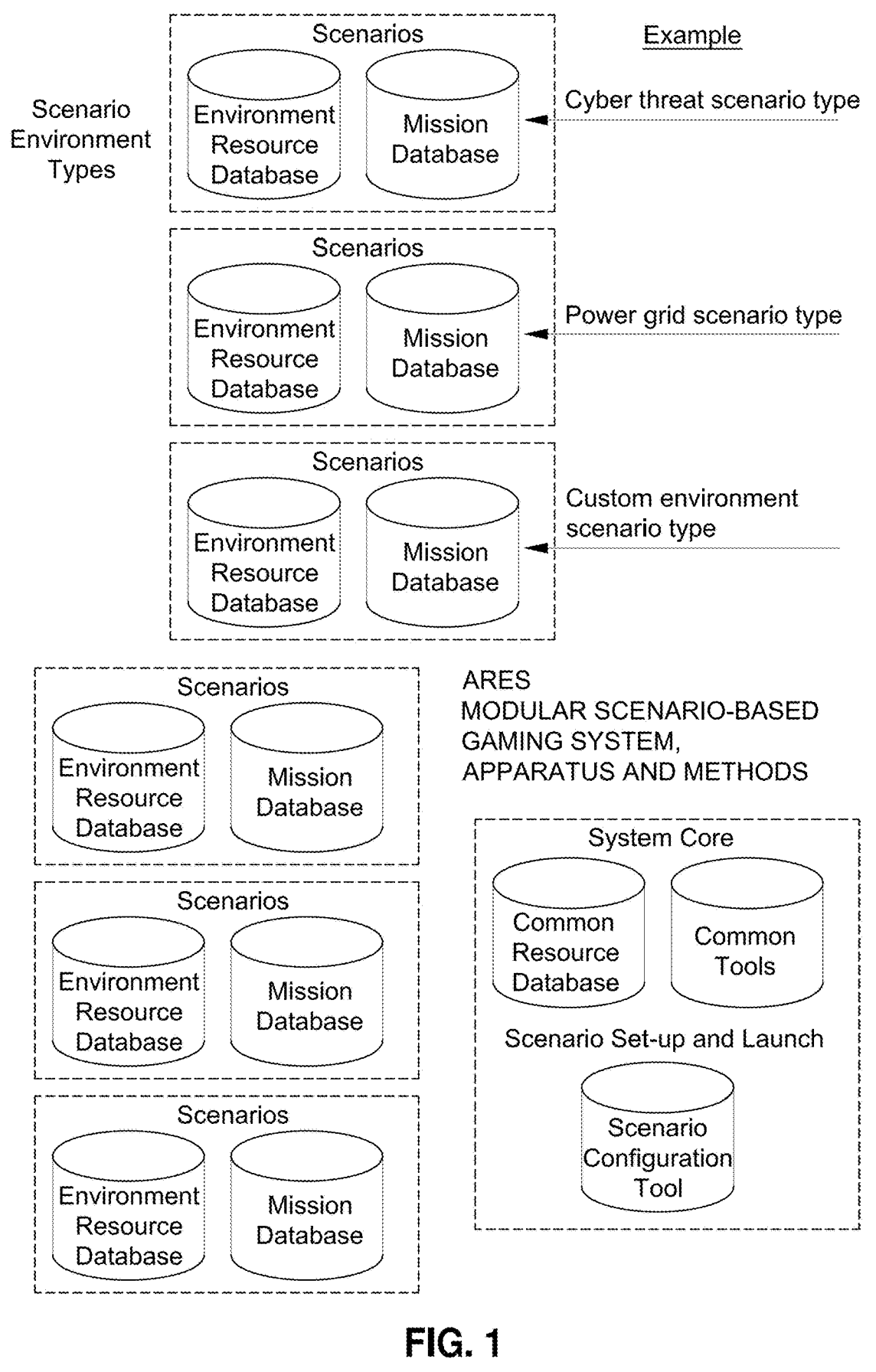
Figure 2:
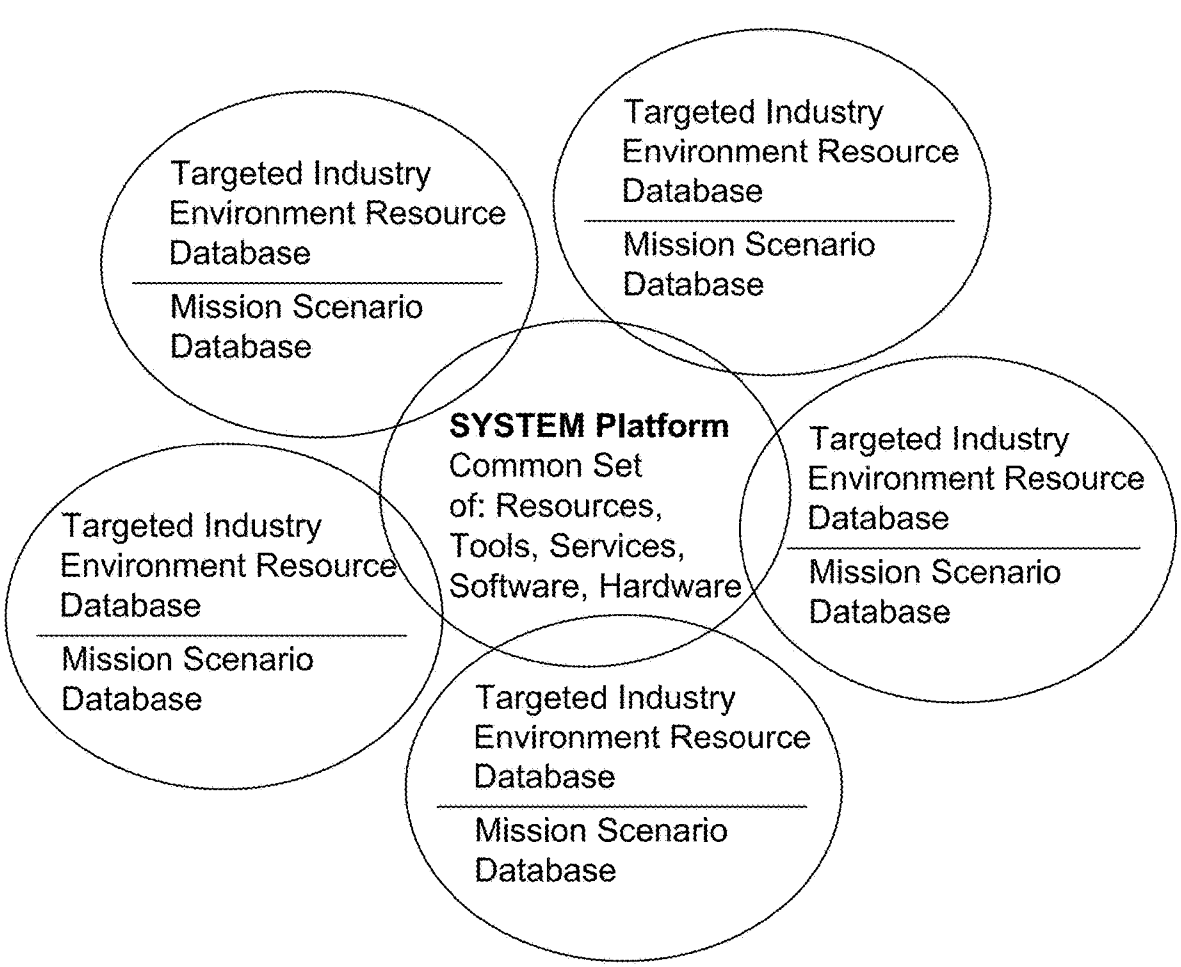
FIG. 2 diagrammatically illustrates an overview of a training system of the invention as such relates to different target industries.

In order to optimize the deployment of a dynamic training system that can support a plurality of industry targets and keep pace with the rapid pace of technology change, the present system may be comprised of a kernel of core system platform resources common to all types of training with a plurality of training environment resource and mission database sets, wherein each set is used for a targeted industry. See FIGS. 1 and 2.

The system configures different missions, each having a unique set of environment resources which are arranged in a particular manner and which have one or unique objectives, whereby every student training session is configurable as a unique mission. In this manner, the system uniquely configures the student's environment, within a virtual closed network environment, with a dynamic set of real-time resources, tools and services to facilitate a specific training scenario for a student in a specific type of industry or activity.

Figure 3:
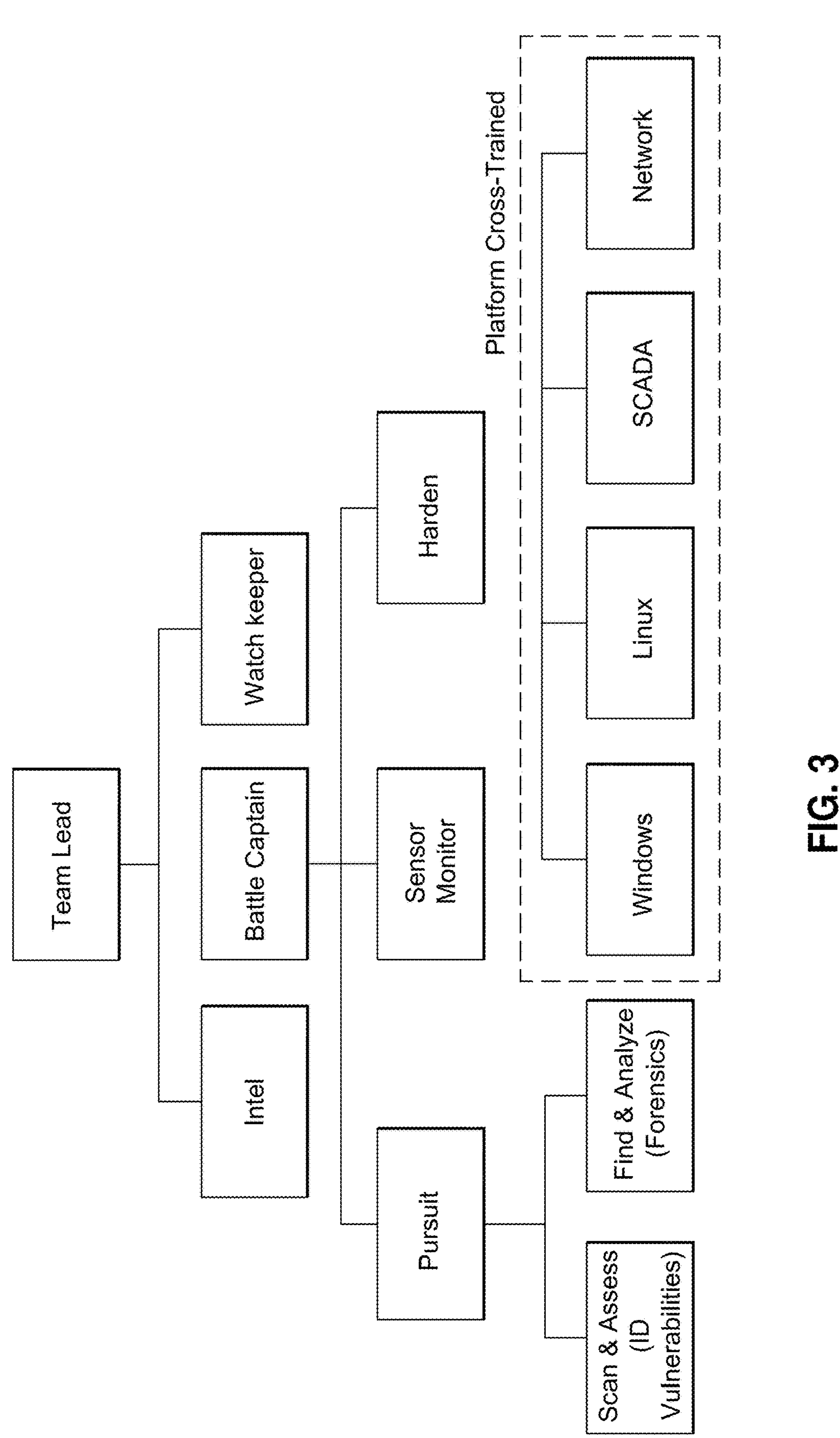
FIG. 3 illustrates various user roles which may be implemented by the training system of the present invention.

Students take on unique roles that emulate jobs in the target industry or functions, such as hacker, cyber offensive operator, cyber defender, or training instructor. Roles may change from mission to mission. The roles may be selected or be defined by one or more databases of predefined roles used for many different missions. Roles may also be defined in customized groups to emulate real-life organizations to further enhance the realistic nature of a particular set of missions. One example of a group of roles used for a particular mission is illustrated in FIG. 3.

Training scenarios and the corresponding missions are implemented as game sessions wherein at least one live student plays against another live student or an AI student. Other embodiments of the system allow team play where more two or more live offensive students play against an AI defensive student or one or more live defensive students play against an AI offensive student or one or more live offensive students.

As used herein, the term "offensive" may refer to types of activities generally undertaken for penetration testing of a target information system ("InfoSys") by information security ("InfoSec") professionals. The term "defensive" may refer to types of activities generally undertaken by an information assurance ("IA") professional for protection of an InfoSys.

In team play, each student may take on a specific role with a unique set of objectives. For example, in one embodiment, an offensive student may take the role of a hacker while a defensive student may take the role of a power infrastructure operator, wherein the hacker attempts to gain access to the power grid. In another embodiment, one student may take on the role of network administrator while the AI opponent may take on the role of a terrorist attempting to hack a targeted website to gain access to backend systems.

The object of the game-style mission may be to complete a plurality of objectives within a predefined time limit. In one embodiment, the games or missions are scored. Based on points and other criteria students earn during missions, a student is scored and may be listed on a leaderboard where teacher/observers can monitor mission results and how the student rates to other students.

The system enables rapid deployment of an infinitely flexible training system to a targeted industry while minimizing cost by the use of a kernel that is maintained for all training systems.

General System Architecture and Methodology

Figure 4:
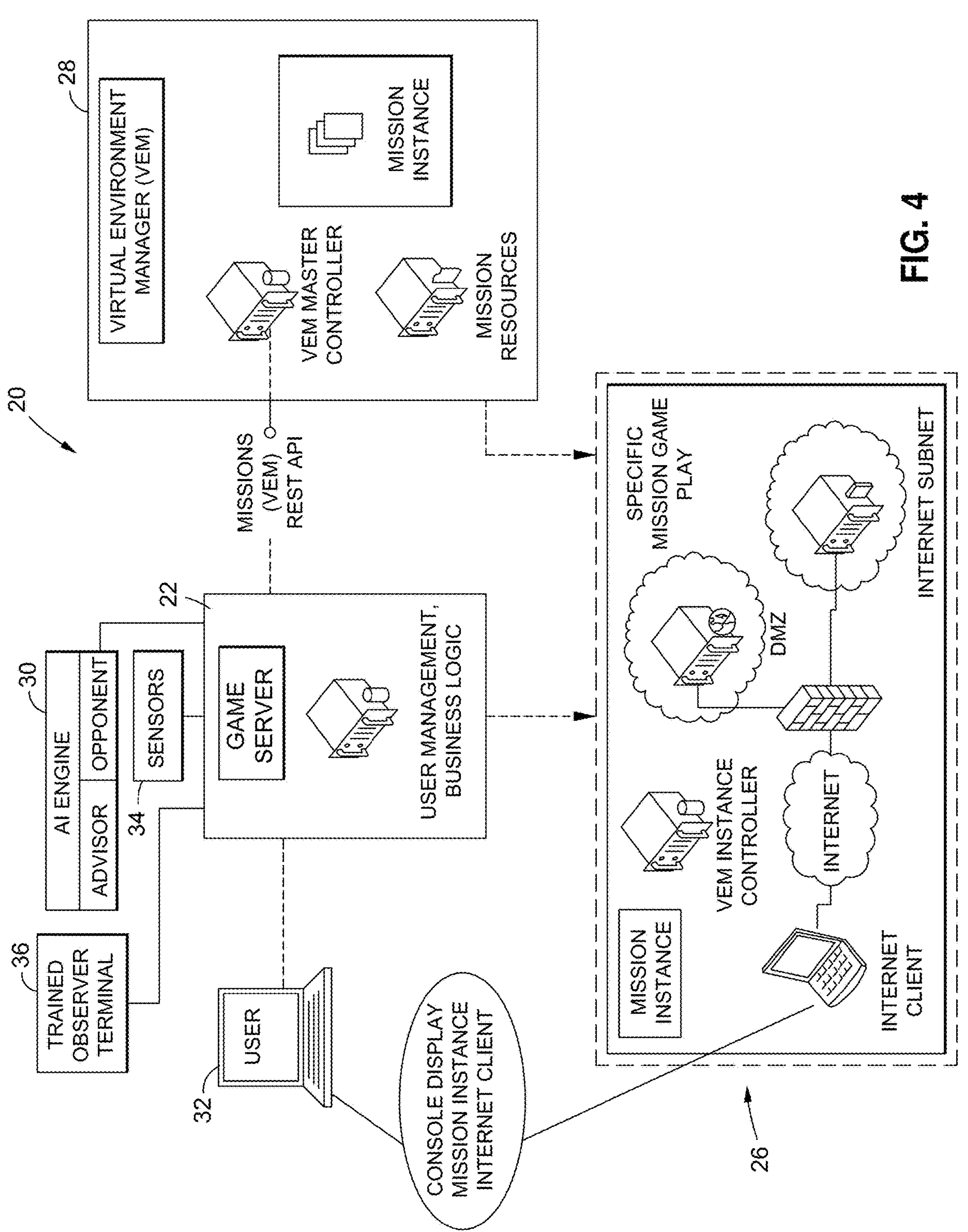
FIG. 4 illustrates one embodiment of a configuration of a training system in accordance with the present invention.

One embodiment of a system architecture in accordance with the present invention is illustrated in FIG. 4. The system 20 may include a game server 22, a virtual event manager (VEM) 28, an artificial intelligence (AI) engine 30, one or more user or player or student stations 32, various game sensors 34, and one or more observer or trainer stations/interfaces 36. As detailed below, the VEM 28 cooperates with the game server 22 to create a virtual implemented mission instance or environment 26 having associated resources.

The player or student station 32 may comprise a computing station or terminal. Preferably, the player station 32 comprises a processor, at least one memory device for storing data such as machine-readable code ("software"), at least one video display device, one or more user input devices (such as a keyboard, mouse, joystick, touchscreen, VR/AR headset, etc.), and at least one communication interface (wireless or wireless) which facilitates communications other components of the system. The player station 32 might comprise, for example, a desktop computer, laptop computer or the like. The player station 32 might be configured as a thin or thick client relative to the game server 22.

The game server 22 may comprise a computing device which is configured with at least one processor, at least one memory device for storing data such as software and at least one communication interface which facilitates communications with other components of the system. The game server 22 preferably receives data or input from other devices, such as the player station 32 and the VEM 28, and generates various data for output to other devices, such as the player station 32 and the VEM 28. In one embodiment, the game server 22 handles user management and authentication (such as player authentication), playback history, scoring and leaderboards and acts a mission information interface between the player and the VEM 28 (and its associated back-end services).

The VEM 28 is preferably implemented as software on a computing device, such as a computing server (for example, both the game server 22 and VEM 28 (as well as the AI engine described below) might be implemented as software on the same computing device/server). This server may be the same or different than the game server 22. The VEM 28 preferably comprises or implements a virtualization management platform that the game server utilizes to create, monitor, and destroy mission related virtual environments. The VEM 28 utilizes underlying orchestration services to perform the active mission management. The VEM 28 provides interfaces to allow the game server 22 to interface to missions, including feedback on player performance and mission control. The VEM 28 interfaces to one or more mission content/configuration databases that it utilizes to create appropriate content based on player selection via the game server 22.

In one embodiment, the VEM 28 implements various control and agent mechanisms to create the necessary training scenario, including the training environment. In one embodiment, these control and agent mechanisms may comprise, as in the example illustrated in FIG. 6, a Mission Orchestration Master, a Mission Orchestration Agent, a Log Server and one or more Collector or Log Agents.

The Mission Orchestration Master is a master which hosts all software and configuration parameters for the mission orchestration agents within the environment, including network and service configurations.

The Mission Orchestration Agent is an agent service (e.g. a specialized software component developed to handle necessary requests and responses to configured and monitor each system dynamically) that runs on all machines within the mission environment and the controller interfaces with these agents to configure local networking and services. It installs packages, copies files from the master and allows arbitrary commands to be run from the master service. It also provides an in-game interface to monitor user progress, enable AI based opponent responses, and verify system health.

The Log Server, such as NxLog, receives agent logs over TCP, adds tags including the originating IP of the log and stores them out to a single text file. These logs may be forwarded to a separate machine, stored in a database, and/or offloaded to the VEM for more permanent storage.

The Collector or Log Agents run on all other machines within the environment and forward logs to the server over the management network. Currently the agents listen to the/dev/log (syslog) and tail the mission agent's log file. Nxlog is also able to support windows event logs and secure transmission of log files.

The AI engine 30 also preferably comprises software running on a computing platform, such as a computing server. The AI engine 30 preferably interfaces with the game server 22, whereby the AI engine 30 obtains data or information regarding missions which are being implemented by the game server 22. This data may comprise, for example, information about a particular student inputs or actions during the game, game status and a wide variety of other information. In one embodiment, the AI engine 30 implements an AI in-game or in-mission advisor. This advisor receives messages or inquiries from a student via the player station 32. The AI in game advisor preferably uses natural language recognition to process the inquiries and provide responses. Most preferably, the AI in-game advisor has a learning component, e.g. it modifies its configuration based upon past messages and responses to create a new configuration. The AI engine 30 also implements an AI opponent. The AI opponent preferably provides actions/responses to the game engine 22 for use in implementing a mission against a student. The AI opponent preferably also has a learning component which allows the AI opponent to change actions and responses over time, such as based upon student actions.

The sensor(s) 34 may comprise various devices or elements (real or virtual) which monitor aspects of the game/mission, such as by monitoring student inputs via the player station 32. The sensor(s) 34 may be associated with the game server 34 to obtain such information. The sensor(s) 34 may provide an output to, for example, the game server 34 or other devices.

The system 20 preferably comprises one or more observer or trainer interfaces 36. These interfaces 36 allow the trainer to effectively mirror the player stations 32. Each trainer interface 36 communicates with the player station to provide a real time view of the player's activity. The interfaces 36 comprise an interface to the game server 22 and VEM 28, whereby information regarding the game play can be mirrored or provided to the observer in real time and the observer can interact with the system 22. The interface may be facilitated by a terminal or station at which the observer may view (such as via a video display) the game play and provide inputs (such as via input devices such as a keyboard, etc.).

Figure 5:
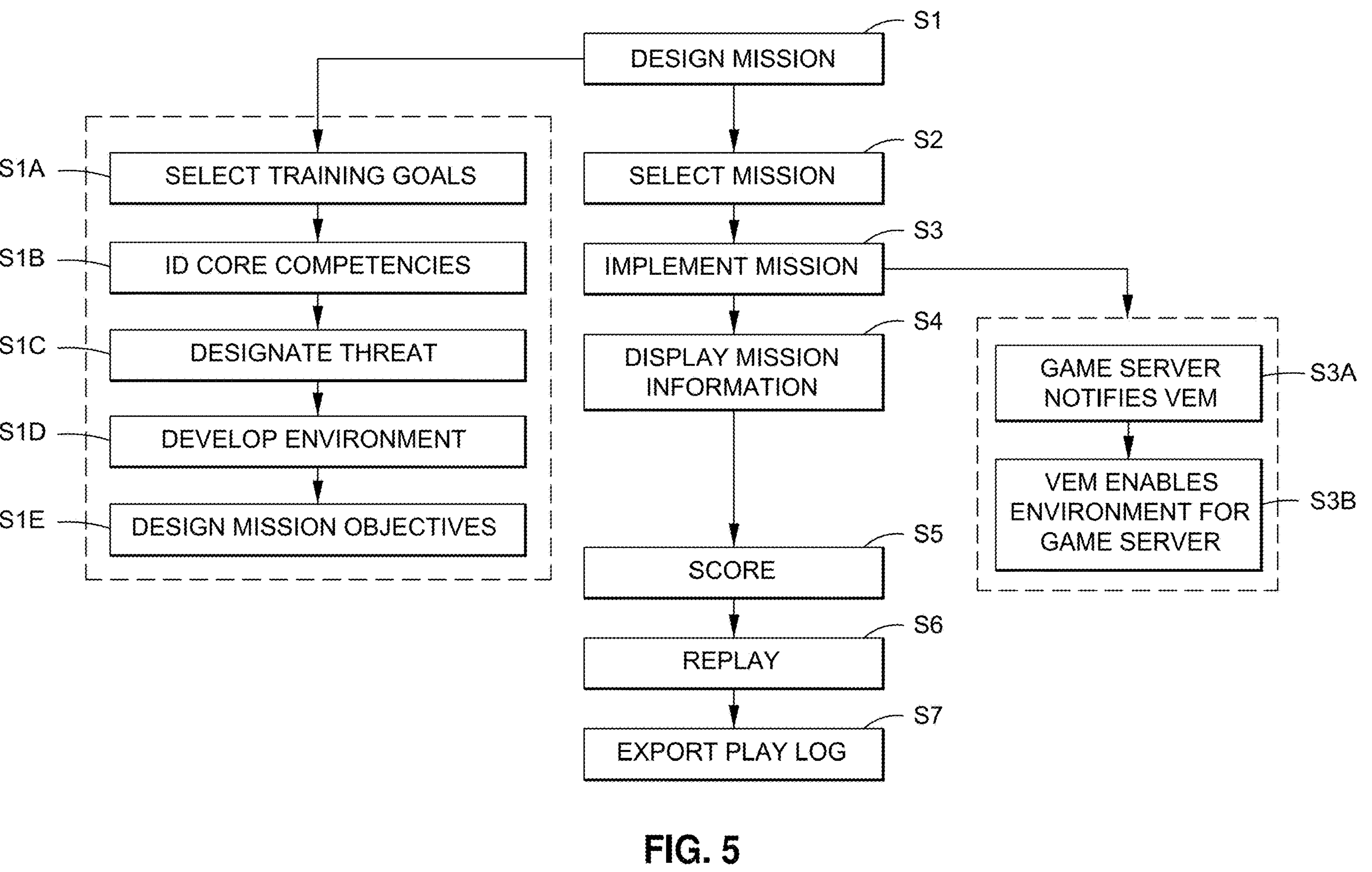
FIG. 5 illustrates a flow diagram of various methods in accordance with the present invention.

As described above, system 20 includes a number of databases, such as databases of virtual resources (tools, network components, etc.) which may be used in forming training scenarios, as illustrated in FIG. 5. Different scenarios may be created from a set of virtual resources and/or other scenarios may be create by changing the sets of virtual resources. Likewise, different missions may be created from the various scenarios. As noted herein, the virtual resources may be used with or coupled with physical devices to form the training environment (for example, a training environment might include a virtual environment as well as a physical router device which is addressed into the system/environment, or other physical devices such as servers, computers, hubs, switches, bridges, modems, access points, repeaters, gateways, firewalls, multiplexers, adapters, data storage devices, etc.).

One embodiment of a training method will be described with reference to FIG. 5. As illustrated therein in a step S1, a mission is designed or developed. This may be performed, for example, by a trainer or operator of the system 20 using one of the trainer interfaces 36 to interface with the VEM 28, such as via a mission editor interface (such as software running on the VEM 28) to develop a mission from the available mission resources (tools, environment components, etc., as detailed above).

In one embodiment, the development of the mission may comprise multiple steps. As illustrated, in a step S1A, the mission designer may select various training goals. In a step S1B, the mission designer may designate or identify various core competencies. These competencies may designate the minimum level of competency required of a player to complete the mission and thus may determine the complexity of the mission. In a step S1C, the mission designer designates a threat or threat actor for defensive missions or a set of targets with known vulnerabilities for offensive missions. In a step S1D, the mission designer uses the mission editor to develop the mission environment. This may comprise the mission designer selecting from the various tools, network devices and the like which are available from the mission resource database. Mission definition can leverage large portions of existing missions when applicable. In a step S1E, the mission designer selects mission objectives. From the selected or provide information or criteria, a mission is designed. This mission may then be stored in the mission database associated with the VEM.

In a step S2, a player or trainer may select a mission from the mission database (for example, a player may select from a list of missions or a trainer may select a mission for player). In one embodiment, a mission may require a core set of competencies. Thus, a player may be required to test or qualify to the designated level of core competencies in order to be entitled to play a designated mission. In one embodiment, for example, a player may be required to take a short test which is implemented via the player station in order to test the player's level of core competency. In another embodiment, the player's level may be stored in a player file and be checked against the minimum core competency level for a particular mission. In this regard, in a preferred embodiment, a player has an associated player profile (such as stored in a database at or associated with the game server). The player preferably logs into the system to identify themselves and associate their player file with their activities. As noted herein, information associated with the player's activities, such as a mission score, are preferably stored in association with an identity of the player.

In a step S3, assuming any designated criteria are met, the selected mission is implemented. In one embodiment, this comprises the game server receiving input from a player or trainer regarding a selected mission and, in a step S3A, the game server notifying the VEM of the selection. In a step S3B, the VEM then enables the mission environment for the game server, using information regarding the mission which is stored in the associated mission database and data regarding the various selected mission resources which are stored in the mission resources database.

In one embodiment, each mission consists of a blueprint of virtual interconnected systems, tools, networks and devices. The VEM deploys the base mission blueprint on virtualized backend hardware infrastructure and ensures that the virtual systems are successfully started and interconnected. Each running mission environment is set up so that it is completely isolated from other concurrently running missions in use by other players.

Each blueprint contains a range of parameters that allows for randomization of the parameters at the start of each play. At the time of mission instantiation, several variables are chosen to determine the characteristics of the mission/game and then the VEM creates a specific mission instance. This allow for variability to a player in repeated attempts of the same mission.

The implementation of the mission also depends upon the configuration of the mission. For example, as indicated herein, two players may play against one another in offensive and defensive roles. This requires that the game server interact with a first offensive player at a first player station and a second defensive player at second player station. In other embodiments, multiple players may be in a similar fashion. As also indicated herein, a player may play against an AI opponent. In this configuration, the AI opponent of the AI engine 30 is enabled relative to the particular mission.

Once the mission is enabled, in a step S4 information regarding the mission environment is displayed to the player(s) and the players begin providing inputs. Again, in the case of play against an AI opponent, the AI engine 30 receives information from the game server regarding the mission and the player's actions and then responds accordingly.

Preferably, as detailed below, the player's actions are scored, as in a step S5. Preferably, the player receives points or scores for actions, rather than just a rating or score for completing a mission. In this manner, the player's competency across a multitude of actions may be evaluated.

During play, mission activities, such as player actions and responses, are tracked/logged, to be part of the replay during the assessment phase. As indicated herein, this information may be stored in one or more mission logs.

In a step S6, once the mission is completed, the player may replay the mission from the stored mission play logs. This allows the player to review their actions and consider mistakes and record lessons learned.

In a step S7, the play log for the mission may also be exported, such as for further review and analysis or to be reviewed at a later time. For example, a player may play a mission and a trainer may later export the mission log for that mission and review the player's actions as part of determining additional training for the player or the like.

Additional details of the invention will now be described.

Mission Orchestration

Figure 6:
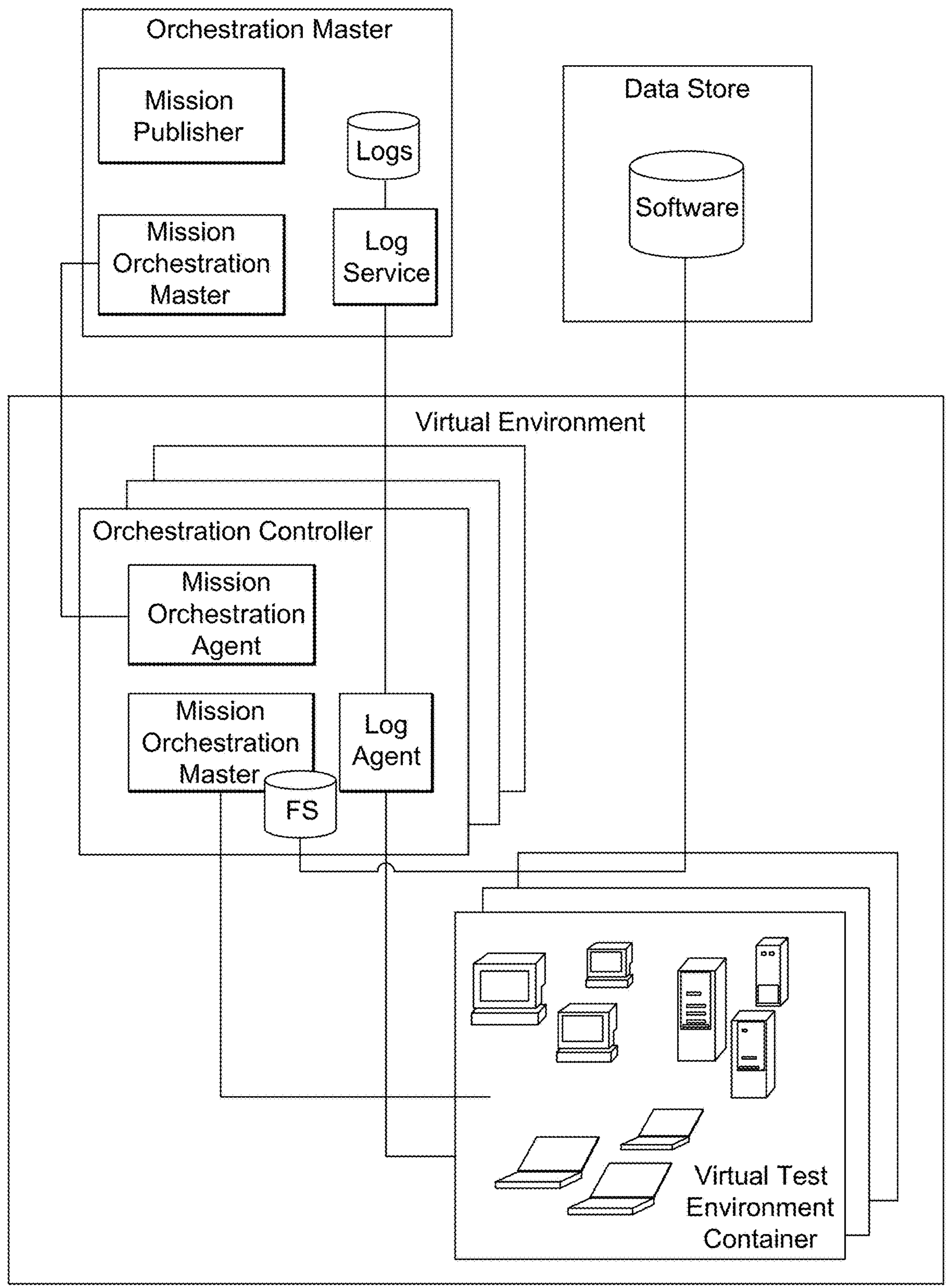
FIG. 6 illustrates one embodiment of a mission orchestration configuration of a system in accordance with the present invention.

FIG. 6 illustrates one embodiment of a mission orchestration configuration. The Orchestration master is a subcomponent of the VEM (identified above). It will be appreciated that other configurations are possible. In the embodiment illustrated in FIG. 6, using a third party virtual computing communication/management framework, such as that provided by Saltstack, the mission orchestration service is responsible for managing an Orchestration Controller (OC) as well as the services within the training environment. The OC exists within the virtual environment and is unique to each environment. An Orchestration Master (OM) exists outside of the virtual environment, as a subcomponent of the VEM in one embodiment, and is responsible for managing multiple OCs.

Upon environment creation, the OM populates the OC with the required configuration files for the test environment. The OC runs the mission orchestration service and a local DHCP service over the management network within the environment. The OC runs both a mission orchestration master and a mission orchestration agent. The OC acts as the master configuration and communication point for the entire mission-specific virtual environment. Configuration and monitoring commands are sent from the OC to individual agents running on the virtual systems which make up the mission environment.

The mission orchestration agent on the OC contacts the OM as its master to facilitate command-and-control as well as configuration file updates. The OC runs a master service to control the local test environment. The test virtual machines are preconfigured to obtain a DHCP address from the OC on the management network. The test virtual machines are also preconfigured with a mission orchestration agent and contact the OC as their mission orchestration master.

When the OC is up to date with the environments configuration files (from the OM), it updates all of the local environments virtual machines. The OC securely mounts a read-only filesystem from a data store comprised of software packages required for the test environment. These packages include both standard packaging (i.e. mirrors of CentOS and Ubuntu software repositories) and custom software to run within the environment. The software is made available to the test environment virtual machines during the initial configuration stages.

A Mission Publisher service runs on the OM which translates the provided environmental configuration files into the mission orchestration environment. These include virtual machine descriptions (e.g. Ravello blueprints and ESXi designs) as well as a network and service configuration file. The network file defines the test network as well as features pertaining to the test network such as gateways and DNS servers. The service file defines services and configuration details of what will run on the virtual machines within the test environment. As described below, in one embodiment the network is defined by a diagram (such as a Visio® diagram) and a human readable data serialization language file (such as a YAML file) with specific configuration details such as the IP address, host name, open ports and key services, functionality running on that host. The diagram is used to lay out the network components visually as game objects with attributes as defined by the YAML file. Of course, other file types might be utilized.

Network-based and host-based software sensors are built into the system to monitor a wide variety of system attributes, states and real-time activities during student missions. For example, host-based system software sensors include applications monitoring log data generated by the system executing concurrent with system operation, state information captured by processes executed during system operation, and background sensor processes that detect one or more system state changes.

Open source, multiple-platform log management functions, such as NXLog, runs within the environment to collect and offload logs from the OC and test environment virtual machines. The system generates one or more logs of information, such as a Syslog (which provides a common logging interface to aggregate log messages from multiple software components) and salt logs (which capture and log information from the Salt orchestration commands and responses) are collected, tagged and sent over management networks to the OC and the OM where they are archived for long-term storage. See FIG. 6.

System Mission Publisher Service

Virtual Machine Description

The virtual machine description includes the following details:

(1) Machine name;

(2) Control network interface MAC; and (3) Any data network interface MAC, IP/MASK, static or DHCP.

These details are translated into a VirtualComponents.NetworkConf class which is later combined with a network.yaml configuration.Network Configuration The network configuration is a human-readable data serialization format YAML file, which defines the networks as well as their gateways, static routes, DNS servers, and DHCP servers. A sample network file is as follows:

TABLE 1

```
networks:
  - network: 192.168.1.0/24
    domain_name_servers:
      - 172.16.0.16
    routes:
      - dest: 0.0.0.0/0
        gateway: 192.168.1.5
  - network: 172.16.0.0/24
    domain_name_servers:
      - 172.16.0.16
    routes:
      - dest: 0.0.0.0/0
        gateway: 172.16.0.16
      - dest: 172.16.10.0/24
        gateway: 172.16.0.15
  - network: 172.16.10.0/24
    domain_name_servers:
      - 172.16.0.16
    routes:
      - dest: 0.0.0.0/0
        gateway: 172.16.10.15
```

This file is read in and combined with the virtual machine description data to create salt pillar files used for network configuration of the data network interfaces.

Service Configuration

The service configuration is a YAML file, which defines services and configuration information corresponding to virtual machine names. Supported services include any built in salt state capabilities as well as service plugins described in a subsequent section. The service configuration has two sections, the first 'configurations' defines the available services and their specific configurations; the second 'services' defines which services should be installed on which virtual machines. Service configuration may be reusable either within a test environment or across environments. A portion of a service configuration follows:

TABLE 2

```
configurations:
  firewall-rules:
    service: firewalld
    name: firewalld
    salt:
      enable: True
      zones:
        external:
          - interfaces:
            - 172.16.0.10
          - port_fwd:
            - 80:80:tcp:192.168.0.11
          - masquerade: True
...
  apache:
    service: apache
    name: apache.vhosts.standard
    salt:
      enable: True
      sites:
        dvwa.com:
          template_file: salt://apache/vhosts/standard.tmpl
      managedtgz:
        - target: /var/www/dvwa.com
          targetdir: /var/www/
```

TABLE 2-continued

```
        source: salt://www_sites/dvwa.tgz
...
services:
  internal_server:
    - nfs-server
    - internal-server-firewall
    - bad-password
    - no-selinux
  webserver:
    - webserver-fw
    - mysql
    - php
    - apache
    - apacheaccess
    - nfs-client
    - bad-password
    - apache-sudoers
  firewall:
    - firewall-rules
  client1:
    - john-the-ripper
```

Service configurations also support configuration transformations. An example usage of this is to transform a plaintext password in the service configuration file into a hashed password, which can be used by the salt user management state. In this case the service configuration would look as follows:

TABLE 3

```
bad-password:
  service: users
  name: users
  transform:
    - userconf
    - root:
      password: R00tp@ssw0rd
    - testuser:
      password: ncc1701d
```

The 'transform' tag notifies the Mission Publisher to perform the 'userconf' transformation when reading the following data in (this transformation method is used to convert generic system configuration information into system specific configuration commands which allows for the use of common configuration syntax in the mission database). Using the high-level programming language Python, the following function is defined in the publisher.service-transformation module.

The function is as follows:

TABLE 4

```
def userconf (netconf, *users) :
  import crypt
  ret = { }
  for i in users:
    for name, data in i.iteritems ( ) :
      ret [name] = [ ]
      if 'password' in data:
        pw = crypt.crypt (data ['password'] ,
crypt.mksalt (crypt.METHOD_SHA512) )
        data ['password'] = pw
        ret [name] .append (pw)
      ret [name] = data
  return {'cfg': ret}
```

The function returns a dictionary structure understood by the salt users state to configure a username and set the password. This could be further extended or another function written to randomly assign a password from a dictionary.

Another example of a transformation is to configure MAC to static IP address mappings for a DHCP server within the data network. This transformation utilizes both the virtual machine description and the network configuration. This is necessary because MAC addresses can be randomly assigned within the virtual environment.

Mission Configuration Example—DOS

Figure 7:
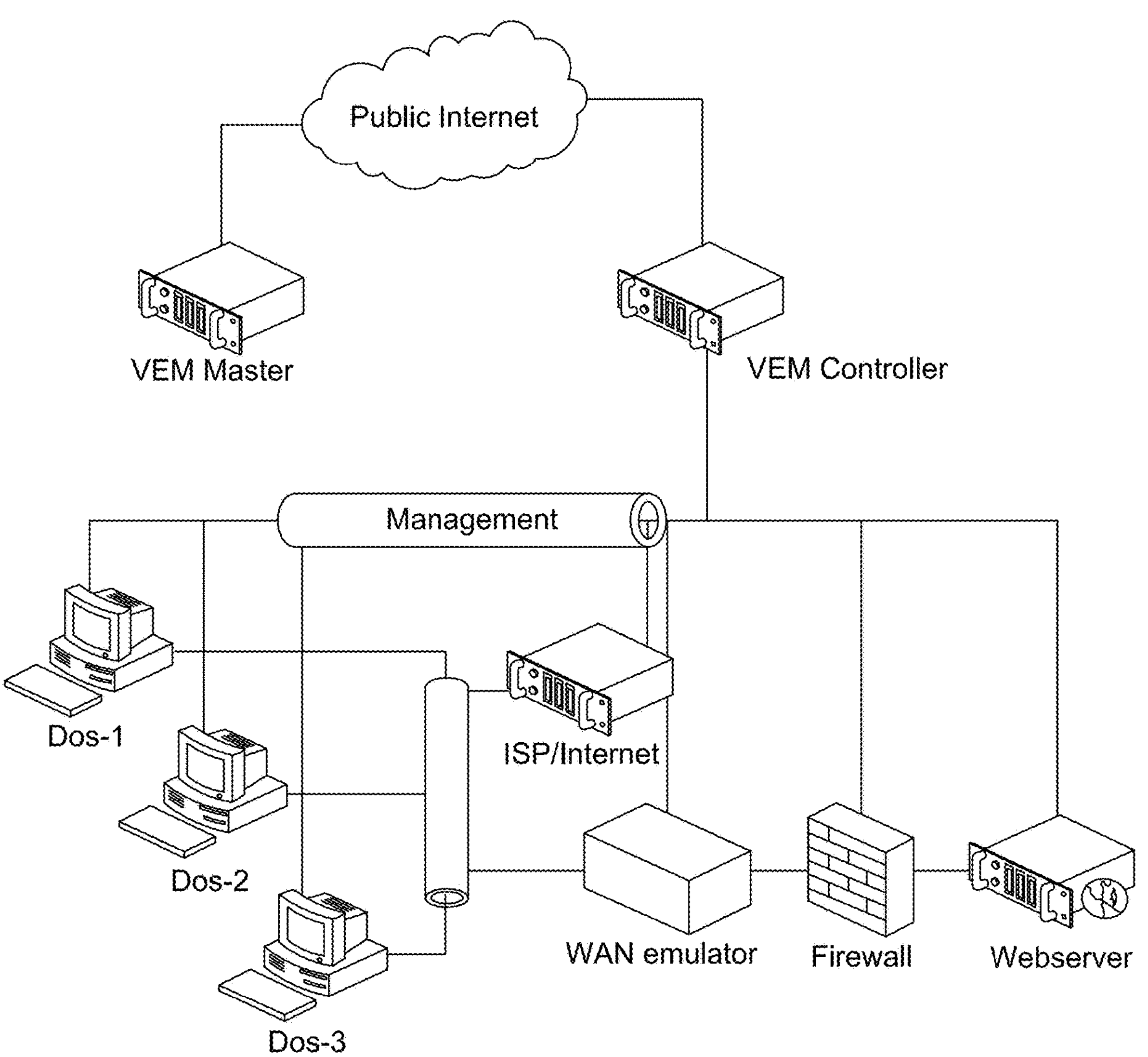
FIG. 7 illustrates one embodiment of an offensive mission configuration implemented by a training system of the invention.

One example of a mission configuration will be described with reference to FIG. 7.

The student is tested with respect to a specific mission, scored and ranked against all other students. Within the virtual environment, virtual machines are configured to run one of a plurality of operating systems and applications wherein each virtual machine emulates specific websites, corporate servers and the like. A student takes on the role of hacker or defender according to the selected mission. One or more students may play against one or more virtual (AI) and/or real opponents.

In a particular embodiment, the present invention allows individuals to test their capabilities against other participant, or an advanced, automated opponent in a realistic virtual environment using a game interface.

Another aspect of the system includes configuring virtual machines within a server-based environment to simulate a real world network environment complete with realistic industry and governmental websites, servers and other software used by information systems.

Figure 8:
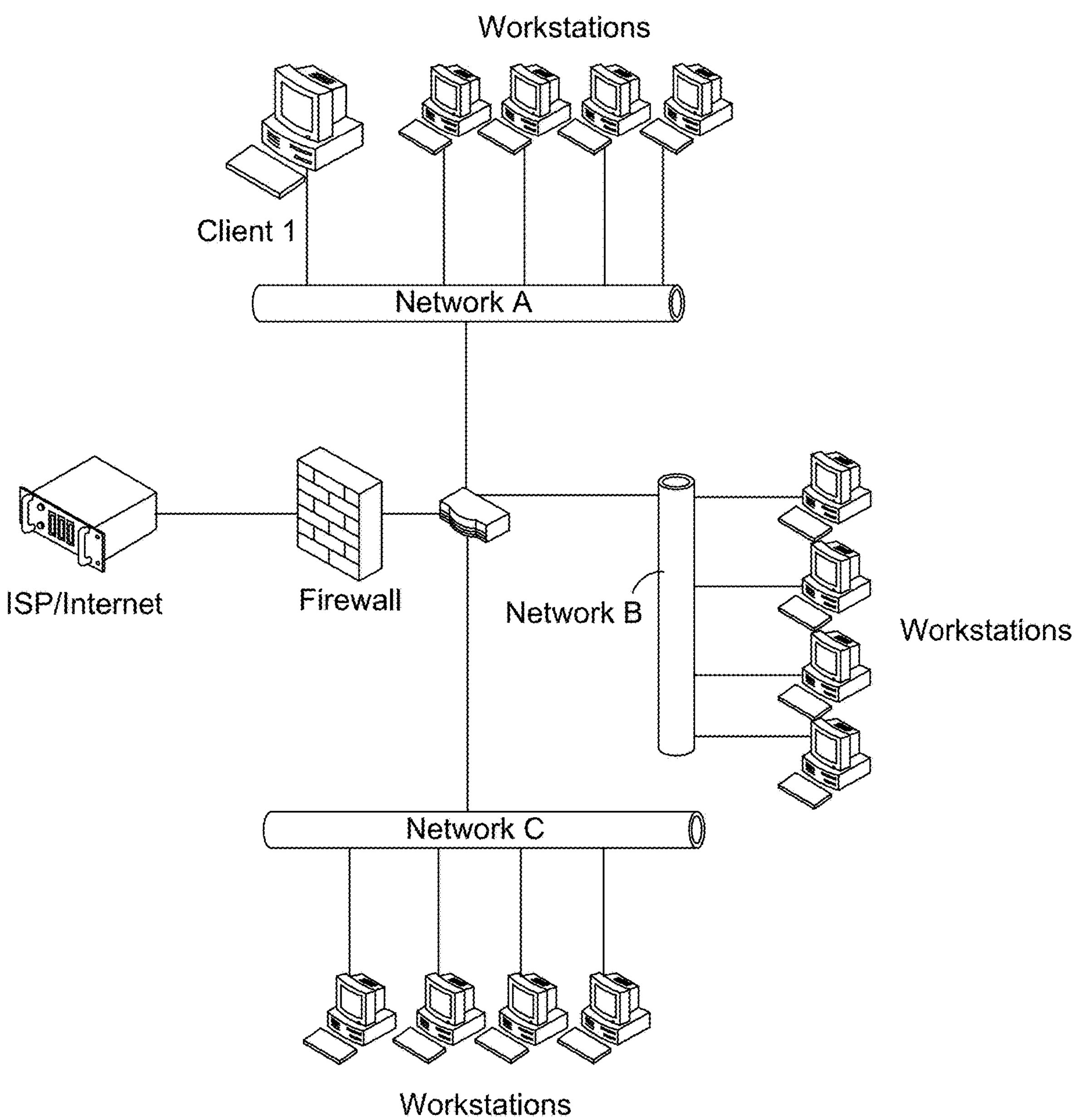
FIG. 8 illustrates one virtual environment for a training mission in accordance with the present invention.

Aspects of the disclosed system infrastructure include: mission creation and recording; deployable virtual environments based on mission selection wherein virtual environments include the use of security components: firewalls, NIDS, Antivirus, and combination of desktops and servers, such as illustrated in FIG. 8.

Unique virtual environments are configured for each mission; the ability to invoke automated capabilities into the environment; verification and recording of results; automated offensive or defensive intelligence deployed based on mission selection; feedback on progress and constraints (e.g. time to accomplish each mission objective); tools the user can utilize in the mission, including: Nmap, Security Onion, Wireshark, etc.; 3rd party visualization of the exercise; user activity logging for post event replay; and a leader board for student result comparison.

Once the disclosed system is configured, the student is presented with an immersive game interface, such as a 3D game interface, where one or more defensive and offensive mission options are available for selection. Each mission includes detailed descriptions of the mission, environment, and goals; visual displays of appropriate environment assets depending on attack/defend visibility; and realistic access to environmental assets such as terminals and vulnerable applications.

In the immersive game-based training environment, the system presents the student an exciting entry into the game (such as an invitation to join cyber forces—such as by having the AI advisor greet the player(s) and provide context on the mission(s) and why it is important that they help) and initial instructions for the user. Once the student selects the mission, the environment is configured and a visual representation of the available assets is displayed along with credentials to access.

When the mission begins, the student is provided with access to resources, feedback on progress/on-line help, and recording of actions. For example, a student may send a message or query to the AI Advisor seeking hints or tips.

When the mission is either completed or terminated, the system records results, provides reports, and gives the student feedback on mistakes. In one embodiment, the system includes a trainer role that allows the trainer to see all of the missions which are being played. The trainer can select a student to observe and join that mission. The trainer can inject comments via chat to the student and change parameter to make the mission easier or harder. The trainer can also provide advice or answer questions during the mission and make comments in the training record of things the student did well or need to work on as feedback presented in an assessment phase.

Other aspects of the disclosed system include mission monitoring for trainers through the use of spectator visualizations of live gameplay and reporting/visualization of historical results per mission/student.

In the game play aspect of the system scenarios include advanced oppositional attack/defend strategies, exploitation vectors, and complex network setups. In addition, the system uses scaffolding (e.g. AI or trainer support and interaction as part of the training process) as a gaming technique to focus and train the student on particular skillsets. Game levels employ a combination of structured and free-play to accomplish a pre-defined overarching training goal. Students are provided subtasks or hints to guide them in their accomplishment of said goal. Additionally, in-game feedback is provided for a pass/fail of subtasks. Subsequent levels are built upon and expand knowledge learned in previous levels.

In other aspects of the system, a Mission Administration component provides:

(1) Creation of mission profiles, including all roles, tasks, goals, and overall parameters defining the mission as well as the definition of the virtual environment needed to house the mission.

(2) Execution of the mission, including orchestration between the Mission Administration and the Virtual Environment Administration, running the appropriate AI tasks based on mission profile and student actions, recording all activity within the mission, providing in-mission feedback, and scoring all student performance.

(3) Production of mission historical analytics, including presentation of mission statistics across all students. The historical game play data will also be utilized by the in-game AI logic to learn and adapt its strategy over time. This enables the game play to change when playing the same mission repeatedly. The game play data repository can also be scanned to identify novel new student tactics and techniques.

(4) Production of student historical analytics, including presentation of student statistics across all missions. In one embodiment, a student creates a student profile and accesses the system using a login associated with their profile. The student's activities are monitored, such as by recording their actions, performed skills/tasks and the like. This information is stored in a data file which may be exported as a training record for that student. This record serves as a persistent record for the student that can be used to review student performance, including skill improvement and regression.

Figure 9:
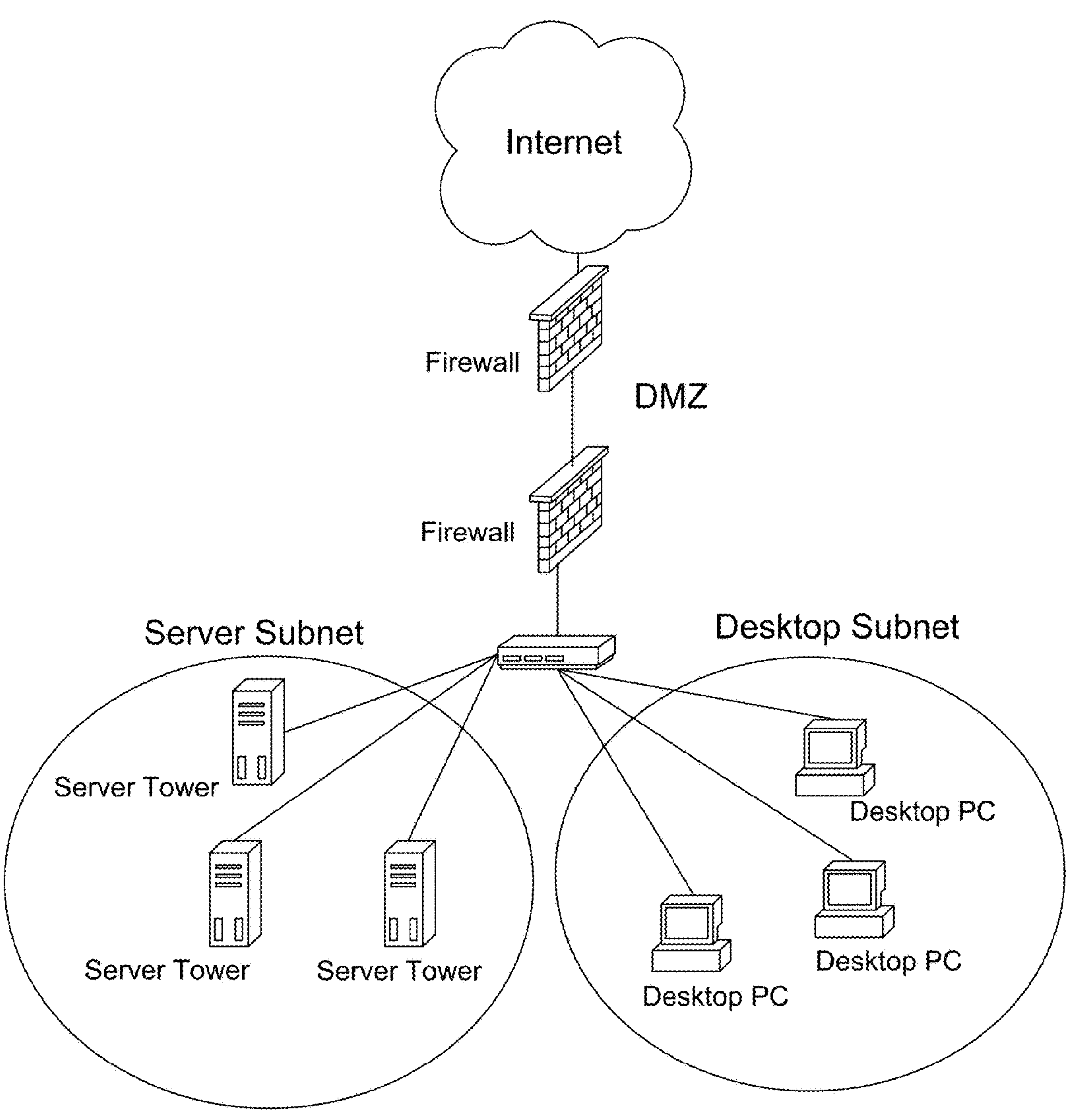
FIG. 9 illustrates another virtual environment for a training mission in accordance with the present invention.

In the virtual environment administration aspect of the disclosed system, a fully realized environment is provided for each mission. The virtual environments include all key components in order to make the training experience a realistic representation of an industry or government agency network environment and information system. As illustrated in FIG. 9, the environment might comprise:

(1) A combination of servers and desktops with appropriate software to expose desired vulnerabilities;

(2) Security components typically found in a small enterprise: firewall, IDS, etc.; and/or (3) One or more subnets with different security constraints for a majority of anticipated missions.

AI Opponent

As described, a mission opponent may comprise an AI opponent (which AI opponent may comprise a defensive opponent to one or more offensive live students or an offensive opponent to one or more live defensive students). In one embodiment, the AI opponent comprises a set of applications and processes focused on parsing all aspects of the system in real-time such as logs, network messages, databases and database states, and the like, to determine if something of operational importance has changed within the particular training scenario. The AI opponent interacts with the Orchestration Agents to obtain information and make operational changes. For example, when the AI component of the system detects a data change and a set of unexpected messages in a cyber threat scenario, it attempts to deduce from a knowledge database the implications of such a scenario and determine all possible root causes. As the AI component gathers additional data to narrow in on the cause, it may provide messages to trainers and students (such as hints, tips or warnings, such as by presenting messages through the in-game advisor feature), it may make changes automatically to the virtual environment within the training scenario in an attempt to remedy a potential breach, it may parse additional aspects of the virtual environment to gather more information, or it may do nothing and continue to monitor. In this way, the game play between one or more human students against an AI opponent emulates real-life scenarios wherein the AI opponent takes actions that a typical administrator would take given the detection of one or more possible cyber threats or system anomalies. In other configurations such as health care training, power grid infrastructure training, custom organization network training, etc. the AI component's knowledge database includes specific details associated with the training and the training scenario at hand.

AI Advisor

The AI advisor uses Natural Language Processing (NLP) to understand user questions and provide appropriate answers. The AI advisor interfaces with the game server to understand mission context and log Q&A information. The UI interacts with AI advisor to ask questions and receive answers.

Observer/Trainer

The trainer has a view of all players and can drill down on specific player interactions as needed. The trainer can obtain a mirrored view of the player's desktop which allows them to view their moves in real time.

Scoring, Analysis and Replays

In one embodiment, the games or missions are scored (such as via the game server monitoring game play activities/actions and awarding points based upon particular criteria). Points may be assigned to particular mission tasks, such as based upon criteria including the complexity of the skill required to complete a task, the time taken to complete a task and/or other criteria. Based on points and other criteria (such as time, detection avoidance, and identification of non-mission specific targets and assets) students earn during missions, a student obtains a mission score. The student's score may be used by trainer to assess the student's aptitude, such as areas where the student is strong or weak, and may thus be used by the trainer to customize additional training for the student or other education on particular skills.

In one embodiment, player scores may be listed on a leaderboard where teacher/observers can monitor mission results and how the student rates to other students. Players may earn virtual badges for achieving certain levels of points relative to a particular mission (for example, a particular mission might have a total possible score of 1000 points and only those players who earn at least 950 points might be awarded an expert defender badge for that mission). In another embodiment, badges might be awarded to players who achieve certain aggregate sums of points across multiple missions. Players might be awarded badges or certain status levels for their performance during certain time periods or the like. The points or badges might be used to certify a player's skill set, including to qualify the player for harder missions (e.g. a player's points may be used to establish a player's competency to a certain level, thus qualifying them for missions which require certain minimum levels of competency.

Mission Examples for Cyber-Warrior Training POC

Mission Design

Four mission examples follow. It should be noted that much more complex missions are supported by the system. Two of the mission examples illustrate the cyber warrior as the offensive student trying to beat the AI-driven defense. The last two mission examples illustrate the cyber-warrior as the defensive student playing to thwart the AI-driven offense.

Highlights of the Missions:

(1) A briefing video is shown to the student as an intro to each mission.

(2) Leaderboard tracks multiple attempts and the score on each attempt. Leaderboard also tracks average scores and best score.

(3) Missions can have Easy, Medium, Hard modes where items such as the AI opponent aggressiveness, mission objectives, and environment complexity are modified based on the selected mode.

(4) When the user selects the mission, the resources are allocated and the virtual environment is automatically created and configured. The AI element is added as part of the configuration.

(5) Other embodiments support scores that count down and missions with fixed durations.

Offensive Mission Example 1

Overview

In this mission, the cyber-warrior, also known as the student, is tasked with stealing a file from a machine located on an internal enterprise network. This mission requires that the student gain a foothold on an external facing application server and pivot to the internal network using a set of provided credentials obtained from previous social-engineering.

Figure 10:
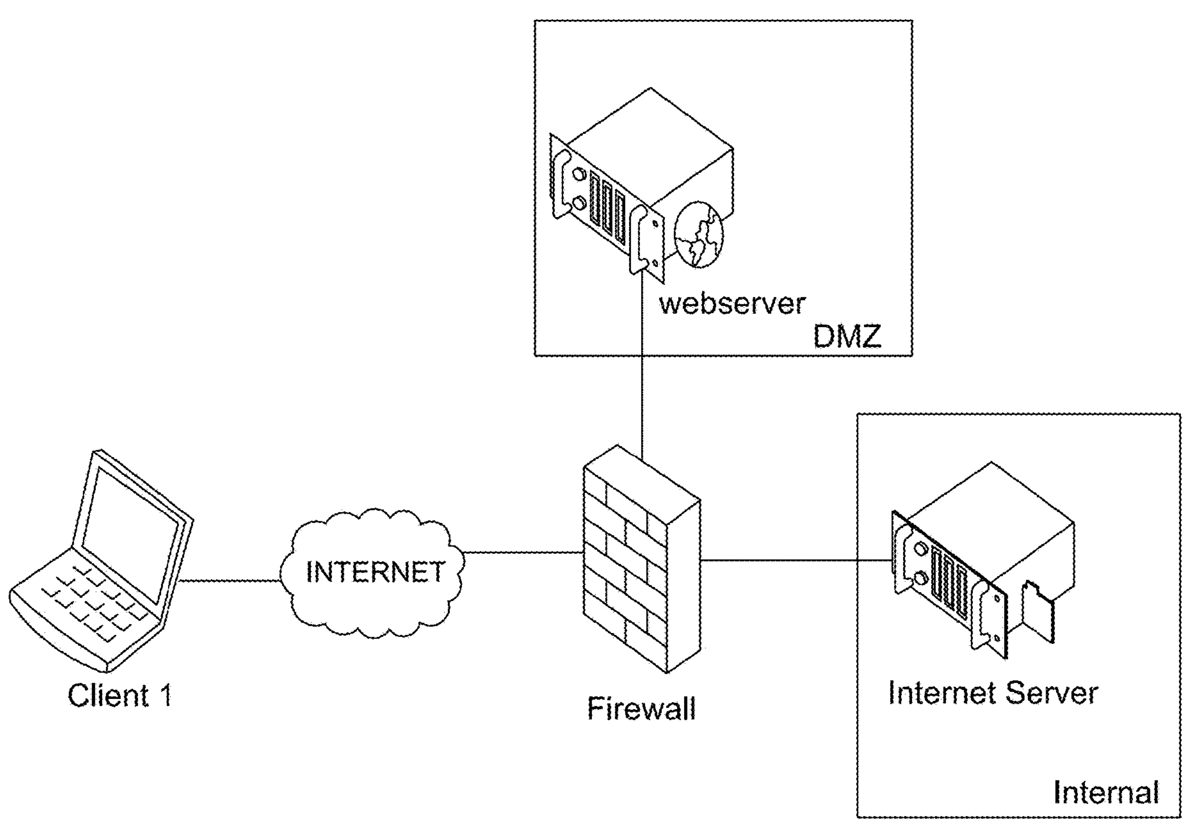
FIG. 10 illustrates another embodiment of mission environment implemented by a training system of the present invention.

FIG. 10 shows a description of the data network for offensive mission 1, data theft from an internal server.

Below is a description of the network configuration as well as relevant services that will be launched on each machine for the mission illustrated in FIG. 10. All network masks are/24 unless otherwise noted.

The VEM Controller runs a salt-master and nxlog server; all other machine run a salt-minion and nxlog agent. The firewall includes a specific permission to allow the webserver in the DMZ access to the file server on the internal network.

The webserver has a NFS mount originating from the internal server. The student, also referred to as student, uses either a password cracker on the local shadow file, or a remote brute force tool. The target file (xmas_gift.txt) is put in the home directory when login is successful.

TABLE 7

| Name | OS | Networks | Services | Purpose |
|---|---|---|---|---|
| VEM Controller | CentOS 7 | 10.0.0.5 | DHCP (management net) YUM/APT during orchestration configuration | Perform orchestration and act as central log collection node. |
| Client1 | XUbuntu 14.04 | 10.0.0.12 172.16.0.12 | THC Hydra John the ripper | |
| Firewall | CentOS 7 | 10.0.0.10 172.16.0.10 192.168.0.10 | Firewalld Forwarding for port 80/ tcp | Restrict external access to DMZ (with DMZ->internal rule present) |
| Webserver | CentOS 7 | 10.0.0.11 192.168.0.11 | Apache PHP, MariaDB NSF-client | Provide a SQLi vulnerable web server |
| Internal server | CentOS 7 | 10.0.0.13 192.168.10.13 | SSHD/telnet-server NSFD | Internal client with target file |

Details

The external facing target system is automatically configured by the system to emulate a corporate website. The cyber-warrior must identify the vulnerable application on the emulated system, perform the SQL injection that gives him access to the underlying file system, and inject a backdoor. The cyber-warrior then accesses the target machine on the internal network from the compromised application server through RDP using stolen credentials to access a sensitive data file.

Student Task Descriptions:

1. Determine vulnerable application providing code execution

2. Write SQL code for injection with backdoor listener or reverse shell
3. Inject SQL code
4. Gain access privileges to public system
5. Access machine on internal network using provided credentials
6. Extract file to attacker machine Task Scoring of Task Descriptions (preferably, a set of points are assigned to each mission objective based upon a degrees of difficulty; these points are tracked in a user history and are used as an indicator of how much the student has played and to what level of difficultly)

1. 15 points
2. 20 Points
3. 20 Points
4. 5 Points
5. 5 Points
6. 10 points

System Configuration

1. Three network segments are automatically configured: a public, DMZ, and internal network.
2. A single firewall is automatically configured by the system utilizing a "three-legged" model to restrict external access to the DMZ.
3. Kali Linux is configured for the student (attacker), Linux firewall, Linux web application server, Windows 2012 web application server, and Windows 7 internal target
4. Apache w/php and sql is configured by the system running as a privileged user.

Detailed Design

System automatically configures and sets up the mission as follows:

1. Maria DB for SQL Injection
2. Create a Webform with a Website
3. The system automatically sets up a simulated repo where cracker tool and other tools are present where student downloads tools from outside of the firewall.
4. The system provides Student with a shell on a machine outside the firewall Mission 1. SQL Inject a reverse shell thru a Webform. Success is when the reverse shell launches a connection.
2. Download a cracker tool—need knowledge of netcat or similar tool. Initially copy it to local webserver.
3. Identify the computer that has an open telnet port. Hack into it using the cracker tool.
4. Telnet into victim and extract the file called 'Christmas Present'—gift.txt. Initially, they could cut-n-paste the content. They wouldn't have to extract it. The present will be located in the place where telnet will initially place the user.

Success is defined by the system as follows:

1. When they extract the file (copy the contents)
2. Points for each individual step Offensive Mission 2

Overview

In this mission, the cyber-warrior, also known as student, launches a distributed denial of service attack on a system.

Figure 11:
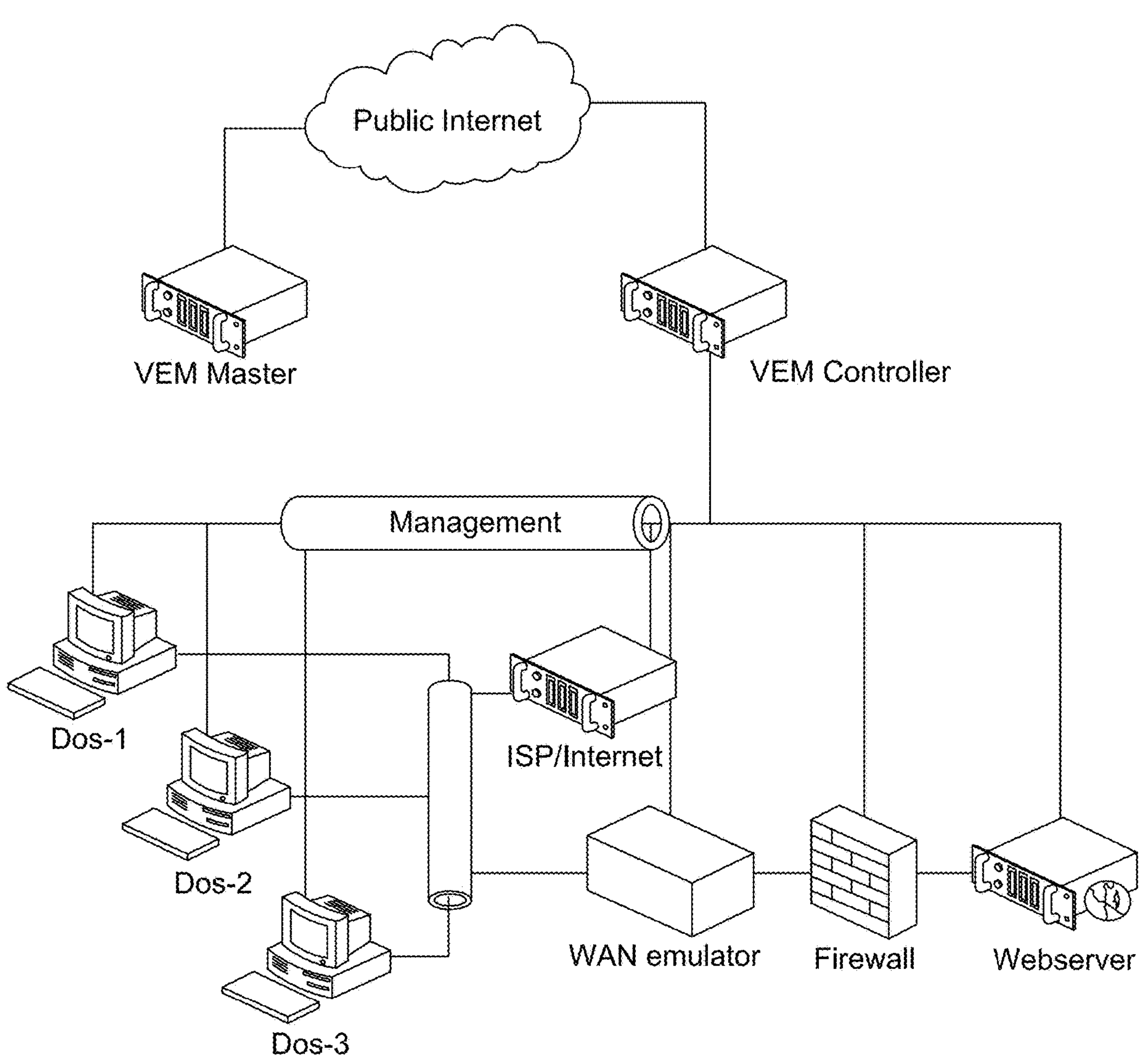
FIG. 11 illustrates yet another embodiment of an offensive mission environment implemented by a training system in accordance with the present invention.

FIG. 11 shows a description of the network connectivity of the offensive mission 2 (DOS attack).

Below is a description of the network configuration as well as relevant services that are launched on each machine. All network masks are/24 unless otherwise noted.

TABLE 8

| Name | OS | Networks | Services | Purpose |
|---|---|---|---|---|
| VEM Controller | CentOS 7 | 10.0.0.5 | DHCP (management net) YUM/APT during orchestration configuration | Perform orchestration and act as central log collection node. |
| Dos-1 | XUbuntu 14.04 | 10.0.0.10 172.16.0.10 | | Student controlled machine. |
| Dos-2 | XUbuntu 14.04 | 10.0.0.11 172.16.0.11 | | Student controlled machine. |
| Dos-3 | XUbuntu 14.04 | 10.0.0.12 172.16.0.12 | | Student controlled machine. |
| ISP/Internet | CentOS 7 | 10.0.0.16 172.16.0.16 172.16.11.11 (alias) | Named Authoritative & caching | Provide DNS services to client machines |
| WAN | CentOS 6.5 | 10.0.0.15 172.16.0.15 172.16.10.15 | tc netem 100 Mb/s, 10 ms latency | Constrain the bandwidth available between the clients and webserver |
| Firewall | CentOS 7 | 10.0.0.13 172.16.10.5 192.168.1.5 | Firewalld Forwarding for 53/udp and 80/tcp | Provide basic firewall functionality in front of the webserver |
| Webserver | CentOS 7 | 10.0.0.14 192.168.1.14 | Apache http://www.whitehouse.gov Named Authoritative for whitehouse.gov | Target webservice for student |

Details

The cyber-warrior is provided with 3 machines with which to launch a denial of service attack on the target system. The student must write the DoS script that utilizes the available machines in a multi-thread fashion. Overall, the cyber-warrior must deny service for X minutes, where X is a configurable parameter.

Task Descriptions:

1. Prepare machines and environment for use in the DOS attack
2. Create script
3. Execute and maintain attack Task Scoring as it Relates to Each of the Task Descriptions 1. 15 Points
2. 30 Points
3. 30 Points Detailed Design System automatically configures and sets up the mission as follows:

1. A Webserver is configured for the student with the Whitehouse website scraped and running.
2. A worker process is created by the system that simulates large requests by doing a spin cycle. This is to simulate a form processing.
3. A large binary file is provided by the system.
4. The system monitors CPU, Memory, Network, and Control the network coming in.
5. Open port 80.
6. Provision servers to match the environment they are attacking (Simple/Advanced)
7. As an option, a load balanced set of webservers is configured by the system
8. The student uses multiple attacking systems (DDoS)

Simple Mission

1. Download a large binary file (2015 Budget). Only if the student downloads this large file, will they DDOS the system.
2. Multiple data accesses to a single computer/machine, such as via a wget tool Advanced Mission The system may add further complexity to any mission such as providing a form on the website that involves a large database request that hits with CPU and network traffic.

Student success is defined when:

1. Student is able to monitor the CPU, Memory and Network.
2. Kill it after it reaches a threshold—80% or based on validating that the user has initiated the desired attack vectors.

Defensive Mission 1

Overview

In this mission, the cyber-warrior, also known as student, will diagnose a likely data exfiltration, find it and block it.

Figure 12:
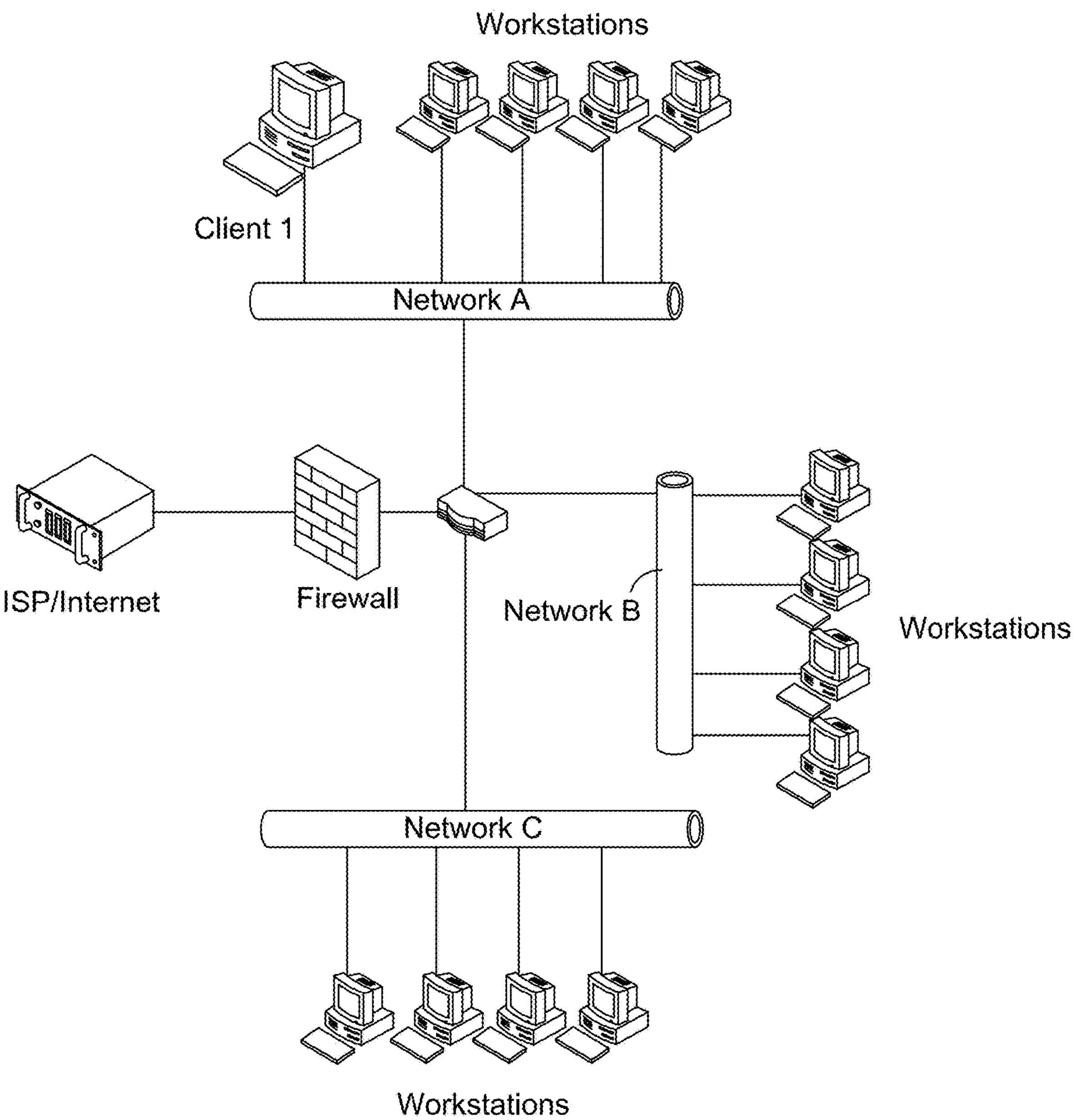
FIG. 12 illustrates an embodiment of a defensive mission environment implemented by a training system in accordance with the present invention.

FIG. 12 illustrates the data network for the exfiltration scenario. The management network has been omitted for clarity, but it matches that of all other scenarios.

Below is a description of the network configuration as well as relevant services that will be launched on each machine. All network masks are/24 unless otherwise noted. The firewall node acts as the router for the internal network routing subnets to one-another.

TABLE 9

| Name | OS | Networks | Services/Tools | Purpose |
|---|---|---|---|---|
| VEM Controller | CentOS 7 | 10.0.0.5 | DHCP (management net) YUM/APT during orchestration configuration | Perform orchestration and act as central log collection node. |
| ISP/Internet | CentOS 7 | 10.0.0.10 172.16.0.11 172.16.11.11 172.16.12.12 . . . | Named Authoritative & caching for multiple sites Apache for multiple sites | Simulate internet connections: provide DNS resolution, provide static web pages, host exfiltration server |
| Firewall | CentOS 7 | firewalld | Masquerade outgoing connections tcpdump | Provide data collection point of all internal traffic to student |
| Client1 | XUbuntu 14.04 | 10.0.0.12 192.168.0.12 | Wireshark snort (not configured) bro (not configured) | Student machine |
| Workstations | XUbunu 14.04 CentOS 7 | 10.0.0.13-10.0.0.24 192.168.0.13-16, 192.168.10.17-20 192.168.20.21-28 | Httperf (subset) | Create background noise in the form of DNS and http |
| Red Workstations | Xubuntu/CentOS | Chosen from workstations | Exfiltration client | Host the exfiltration software |

Details

The cyber-warrior must scan logs, identify the error code that suggests there is a data exfiltration issue related to a vulnerability in HTTP.sys, identify the affected system, locate the exfiltration code, and remove it.

Task Descriptions

1. Scan logs
2. Scan servers for vulnerability
3. Remediate vulnerability
4. Locate and block exfiltration code Task Scoring as it Relates to Each of the Task Descriptions 1. 10 points
2. 10 points
3. 15 points
4. 15 points Necessary Environment and Tools Detailed Design System automatically configures and sets up the mission as follows:

1. 3 subnets are configured with multiple systems
2. One or more systems are exfiltrating data.
3. Simulated webservers and traffic generation.
4. Network is setup with port 80 and other outbound traffic
5. Student is dropped into a console on one of the machines
6. Traffic gen is a simple wget loop. One of them is a bad website.

Simple mission version:

1. Detect one exfiltration to a non-standard port

Advanced mission version:

1. Multiple ex-filtrations
2. Have one of the system that slowly sends data out using netcat (on port 80).
3. Make the ex-filtration process capable of auto restart so just a kill will not suffice.
4. Additional obfuscation of the infiltrating process and its location Mission 1. Defender must monitor traffic on all 3 subnets and look for abnormalities.
2. Defender must: Scan network; Login to all 3 subnets; Have a packet monitoring like Snort/Tcpinfo to isolate exfiltration traffic; Shutdown exfiltration; Identify the user.

Success: Defender has identified ex-filtration and shut it down; and Defender identifies the user.

Defensive Mission 2

Overview

In this mission, the cyber-warrior, also known as student, must identify misconfigured NFS on a slave within a cluster of machines and remove a Trojan.

Details

Once the AI attacker has exploited a misconfigured NFS and deposited a Trojan, the cyber-warrior will scan the machines within the cluster to find the slave with the misconfiguration. Then, he will fix the misconfiguration to block the vulnerability. Then he will find the Trojan and remove it.

Task Descriptions

1. Scan cluster for misconfiguration
2. Configure NFS
3. Locate Trojan and remove it Task Scoring as it Relates to Each of the Task Descriptions 1. 10 points
2. 5 points
3. 15 points Necessary Environment and Tool Detailed Design System automatically configures and sets up the mission as follows:

1. NFS environment with multiple subnets—A, B, C. A has NFS, B uses NFS and C does not.
2. Plant a Trojan—indicator process owned by root and is executable by all. Also need other files that are not Trojans.
3. Multiple mis-configurations
4. Student is dropped into an Admin shell Student's Mission 1. Need to figure out who is exporting outside of the authorized subnet
2. Find all N NFS servers and list out names in a Text File
3. Ensure correct permissions. Put in a * in mis-configuration and have the defender find it.
4. Fix it by logging into the bad one and fix config and restart NFS.
5. Find the Trojan which is running. Maybe this changes the NFS configuration back if they don't kill it.

Success

1. Defender has identified all mis-configured NFS servers.
2. Defender has rectified the configuration.
3. Defender has found and neutralized the Trojan.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system for implementing game-style cyber-threat training to a student relative to a generated scenario-specific virtual environment via a real world to virtual environment interface comprising:

a student station comprising a processor, a video display, and a student input device;

a game server comprising a processor and a memory, said game server in communication with said student station over an interface;

a database of training scenarios stored in association with said game server;

a scenario resource database of scenario resources including virtual tools, virtual network components and network components;

a trainer station comprising a processor, a video display and a trainer input device, the trainer station connected to the system server and communicating with the student station;

a trainer interface presented at the trainer station, the trainer interface presenting a duplicate of at least a portion of information presented at the student station to provide to a trainer a real-time view of activity of a student on the student station;

a virtual event manager in communication with said game server;

said game server configured to receive input from said student station or from the trainer station of a selected one of the training scenarios stored in the database of training scenarios;

said virtual event manager configured to generate, in response to receiving information from said game server regarding said selected training scenario and data defining a virtual scenario-specific computing environment for said selected training scenario corresponding thereto stored in said database and said scenario resources, said virtual scenario-specific computing environment comprising a virtual network comprising a plurality of virtual devices and one or more communication links linking said virtual devices; and a training scenario interface permitting communications between said game server and said plurality of virtual devices within said virtual scenario-specific computing environment, said training scenario interface comprising:

an orchestration master associated with said virtual event manager outside of said virtual scenario computing environment; and an in-scenario interface comprising:

an orchestration controller within said virtual scenario computing environment; and an orchestration agent associated with each of said plurality of virtual devices, wherein said orchestration master provides configuration files to said orchestration controller for configuring the plurality of virtual devices in said virtual scenario-specific computing environment, said orchestration agents establish a communication link with the orchestration controller within said virtual scenario-specific computing environment, said orchestration master transmits information to said orchestration controller regarding one or more student actions input to said student station, said orchestration controller implements said student actions within said virtual scenario-specific computing environment by transmitting commands to said orchestration agent associated with one or more of said plurality of virtual devices, and wherein said orchestration agents transmit responses to said orchestration controller reflective of changes to said virtual scenario computing environment which are provided to said game server via said orchestration, said game server further configured to implement a cyber-threat opponent to said student, including communicating with said training scenario interface to receive information regarding the virtual scenario-specific computing environment and actions by said student to generate opponent actions which are implemented by the training scenario interface, said game server configured to cause said student station to display information regarding said virtual scenario-specific environment to said student, including changes to said virtual scenario-specific environment implemented by said in-scenario interface in response to said one or more student actions and said opponent actions by said cyber-threat opponent, and said game server configured to generate a student evaluation based upon student actions during said training scenario.

2. The system of claim 1, further comprising log agents associated with each of said plurality of virtual devices, said log agents configured to collect and communicate log information to a collector log associated with said virtual event manager to generate logs of activity for replays, scoring, and evaluation.

3. The system of claim 1, wherein said game server implements responses and said responses by said game server comprise actions by said implemented cyber-threat opponent.

4. The system of claim 1, comprising a first virtual scenario environment corresponding to a first training scenario and at least one first student using at least one first student station and a second virtual scenario environment corresponding to a second training scenario and at least one second student using at least one second student station.

5. The system of claim 4, wherein a first in-scenario interface is associated with said first virtual scenario environment and a second in-scenario interface is associated with said second virtual scenario environment, said first and second in-scenario interfaces communicating with said virtual environment master controller.

6. The system of claim 5, wherein first orchestration agents are associated with each of said plurality of virtual devices in said first virtual scenario environment and said second orchestration agents are associated with each of said plurality of virtual devices in said second virtual scenario environment.

7. The system of claim 1, wherein said training scenario is selected by a student via input to said student station.

8. The system of claim 1, wherein said training scenario is selected by a user of said trainer station.

9. The system of claim 1, further comprising a collection agent associated with said virtual scenario-specific environment, said collection agent configured to collect information regarding actions relating to the virtual scenario-specific environment.

10. The system of claim 1, wherein said game server implements responses and said responses are based upon inputs from a second student acting as an opponent to a first student.

11. The system of claim 1, wherein said orchestration agents use commands transmitted thereto from said orchestration controller to change a configuration of the associated virtual device in said virtual scenario-specific environment.

12. The system of claim 1, wherein said orchestration agent establishes said communication link using an IP address generated by a dynamical host configuration protocol.

13. The system of claim 11, wherein said student evaluation comprises a game score.

14. The system of claim 13, wherein a collection agent is associated with each virtual device in said virtual scenario-specific environment.

* * * * *